United States Patent
Miyamoto et al.

(10) Patent No.: US 8,850,088 B2
(45) Date of Patent: Sep. 30, 2014

(54) MANAGEMENT SYSTEM AND MANAGEMENT METHOD

(75) Inventors: Yuuki Miyamoto, Yokohama (JP); Katsutoshi Asaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 104 days.

(21) Appl. No.: 13/576,479

(22) PCT Filed: Apr. 18, 2012

(86) PCT No.: PCT/JP2012/060464
§ 371 (c)(1),
(2), (4) Date: Aug. 1, 2012

(87) PCT Pub. No.: WO2013/157094
PCT Pub. Date: Oct. 24, 2013

(65) Prior Publication Data
US 2013/0282935 A1    Oct. 24, 2013

(51) Int. Cl.
*G06F 3/00* (2006.01)
*G06F 5/00* (2006.01)

(52) U.S. Cl.
USPC .......................................................... 710/38

(58) Field of Classification Search
None
See application file for complete search history.

(56) References Cited

U.S. PATENT DOCUMENTS

| | | | |
|---|---|---|---|
| 2006/0248297 A1* | 11/2006 | Watanabe et al. | 711/162 |
| 2009/0265577 A1 | 10/2009 | Haramai et al. | |
| 2010/0318579 A1* | 12/2010 | Satoyama et al. | 707/802 |
| 2011/0066823 A1 | 3/2011 | Ando et al. | |
| 2011/0258405 A1 | 10/2011 | Asaki et al. | |
| 2012/0030404 A1 | 2/2012 | Yamamoto et al. | |

FOREIGN PATENT DOCUMENTS

| | | |
|---|---|---|
| JP | 2009-259031 A | 11/2009 |
| JP | 2011-060119 A | 3/2011 |
| JP | 2011-227563 A | 11/2011 |

* cited by examiner

*Primary Examiner* — Kris Rhu
(74) *Attorney, Agent, or Firm* — Volpe and Koenig, P.C.

(57) ABSTRACT

A computer system includes a server using a virtual volume (virtual logical volume) shared by a plurality of storage apparatuses. A management system managing the computer system accepts a selection of a first storage apparatus to be a determination target from among the storage apparatuses, performs a first determination of whether a first access path including the first storage apparatus exists or not. If the first access path exists, the management system performs a second determination of whether or not the first access path is an active access path used by the server for accessing the storage area (the storage area of the storage apparatus) assigned to a part of the virtual volume used by the server, and determines whether the first storage apparatus can be stopped or not on the basis of a result of the first determination or a result of the second determination. The access path is a path from the server to one of the storage apparatuses.

17 Claims, 32 Drawing Sheets

| VM | Size | LUN | Leading address |
|---|---|---|---|
| VMa | 100GB | LUN 0 | 0x0000 |
| VMb | 200GB | LUN 0 | 0x0100 |
| VMc | 200GB | LUN 0 | 0x0200 |

Fig. 7

| WWN (2221) | Virtual volume ID (2222) | Port (2223) | LUN (2224) |
|---|---|---|---|
| WWN-1 | Volume 3 | Port 11 | 0 |

| Access destination storage (2231) | Transit storage (2232) |
|---|---|
| Storage 2 | - |
| Storage 3 | Storage 2 |

| Virtual page | | Real page | | |
|---|---|---|---|---|
| Virtual volume ID (2241) | Address (2242) | Storage (2243) | RAID group (2244) | Address (2245) |
| Volume 3 | 0x0000 | Storage1 | RAID group1 | 0x0000 |
| | 0x0010 | Storage1 | RAID group1 | 0x0010 |
| | 0x0020 | Storage1 | RAID group2 | 0x0000 |
| | 0x0030 | Storage1 | RAID group2 | 0x0010 |
| | 0x0040 | Storage1 | RAID group3 | 0x0000 |
| | 0x0050 | Storage1 | RAID group3 | 0x0010 |
| ... | ... | ... | ... | ... |

| Host | WWN |
|---|---|
| Virtual server1 | WWN-1 |
| Virtual server2 | WWN-2 |

| Host | Virtual volume ID | Storage | Port | LUN |
|---|---|---|---|---|
| Virtual server 1 | Volume 3 | Storage1 | Port11 | 0 |
| Virtual server 2 | Volume 3 | Storage3 | Port31 | 0 |

| Access originator storage | Access destination storage | Transit storage |
|---|---|---|
| Storage 1 | Storage 2 | - |
|  | Storage 3 | Storage 2 |
| Storage 2 | Storage 1 | - |
|  | Storage 3 | - |
| Storage 3 | Storage 1 | Storage 2 |
|  | Storage 2 | - |

| Virtual page | | Real page | | |
|---|---|---|---|---|
| Virtual volume ID (1531) | Address (1532) | Storage (1533) | RAID group (1534) | Address (1535) |
| Volume 2 | 0x0000 | Storage1 | RAID group1 | 0x0020 |
|  | 0x0010 | Storage1 | RAID group1 | 0x0030 |
| ... | ... | ... | ... | ... |
| Volume 3 | 0x0000 | Storage1 | RAID group1 | 0x0000 |
|  | 0x0010 | Storage1 | RAID group1 | 0x0010 |
|  | 0x0020 | Storage1 | RAID group2 | 0x0000 |
|  | 0x0030 | Storage1 | RAID group2 | 0x0010 |
|  | 0x0040 | Storage1 | RAID group3 | 0x0000 |
|  | 0x0050 | Storage1 | RAID group3 | 0x0010 |
| ... | ... | ... | ... | ... |

| VM | Size | Virtual volume ID | Leading address |
|---|---|---|---|
| VMa | 100GB | Volume 3 | 0x0000 |
| VMb | 200GB | Volume 3 | 0x0100 |
| VMc | 200GB | Volume 3 | 0x0200 |
| VMd | 1TB | Volume 3 | 0x0300 |
| VMe | 400GB | Volume 3 | 0x0700 |
| VMf | 100GB | Volume 3 | 0x1000 |

Fig. 16

| Virtual server | VM |
|---|---|
| Virtual server1 | VMa |
|  | VMb |
|  | VMc |
| Virtual server2 | VMd |
|  | VMe |
|  | VMf |

| Virtual server | Access destination storage (1632) | Data storing destination storage (1633) | Transit storage (1634) |
|---|---|---|---|
| Virtual server1 | Storage1 | Storage1 | - |
| | Storage1 | Storage3 | Storage2 |
| Virtual server2 | Storage3 | Storage1 | Storage2 |
| | Storage3 | Storage3 | - |

| Virtual server (1641) | Access destination storage (1642) | Data storing destination storage (1643) | Transit storage (1644) | Active/inactive (1645) |
|---|---|---|---|---|
| Virtual server1 | Storage1 | Storage3 | Storage2 | Inactive |
| Virtual server2 | Storage3 | Storage1 | Storage2 | Inactive |

| Virtual server | VM | Data storing destination storage |
|---|---|---|
| Virtual server1 | VMa | Storage1 |
| | VMb | Storage1 |
| | VMc | Storage1 |
| Virtual server2 | VMd | Storage3 |
| | VMe | Storage3 |
| | VMf | Storage3 |

| VM | Migration destination virtual server |
|---|---|
| VMa | Virtual server2 |
| VMb | |
| VMc | |
| VMd | Virtual server1 |
| VMe | |
| VMf | |

Figures 34, 35:
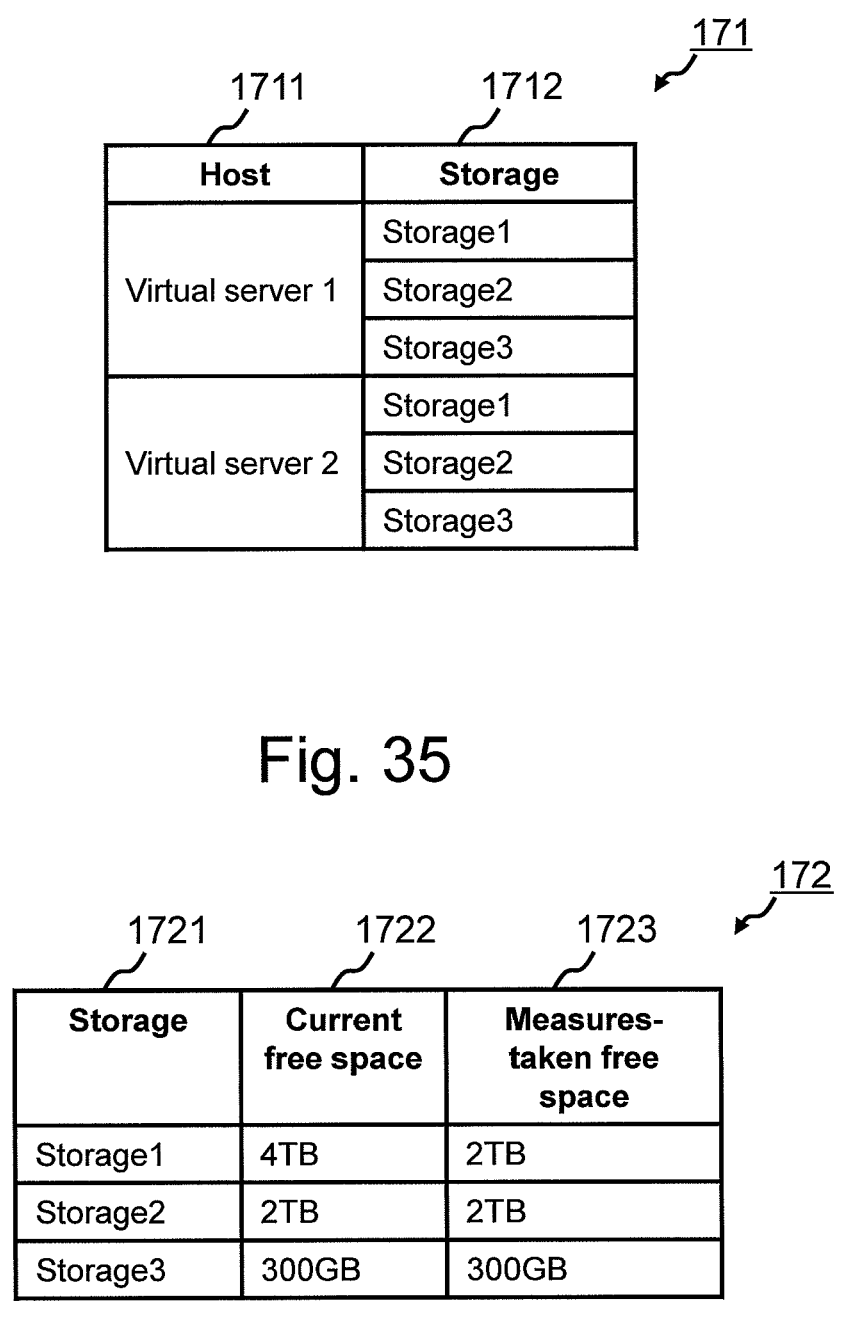

| Host | Storage |
|---|---|
| Virtual server 1 | Storage1 |
|  | Storage2 |
|  | Storage3 |
| Virtual server 2 | Storage1 |
|  | Storage2 |
|  | Storage3 |

| Storage | Current free space | Measures-taken free space |
|---|---|---|
| Storage1 | 4TB | 2TB |
| Storage2 | 2TB | 2TB |
| Storage3 | 300GB | 300GB |

1721, 1722, 1723

Fig. 36
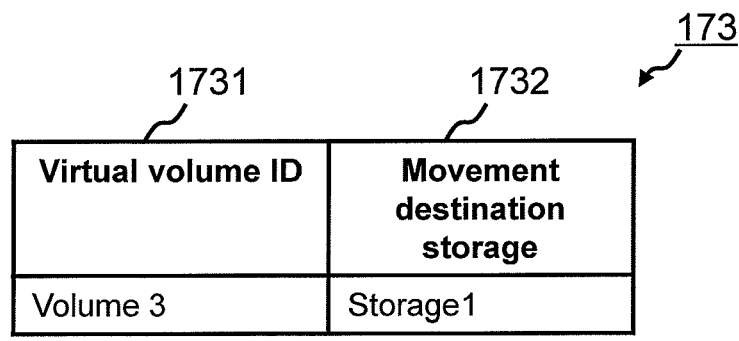
Fig. 37
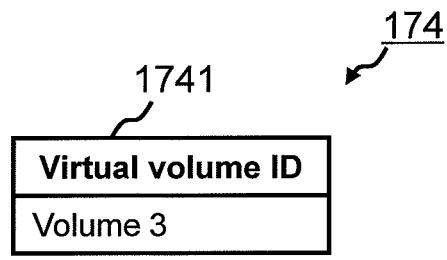
Fig. 38
| Virtual volume ID | Space | Occupied space |
|---|---|---|
| Volume 2 | 1TB | 200GB |
| Volume 3 | 3TB | 2TB |
| ... | ... | ... |

MANAGEMENT SYSTEM AND MANAGEMENT METHOD

TECHNICAL FIELD

The present invention relates to a management system that manages a computer system, and a management method for the same.

BACKGROUND ART

A technique has been proposed that, in an environment where a plurality of storage apparatuses are operated, virtualizes the storage apparatuses into one virtual storage apparatus to thereby facilitate the operation and management. According to this technique, a host can access a virtual logical volume (hereinafter referred to as a "virtual volume") provided by the virtual storage apparatus, from any of physical storage apparatuses comprising the virtual storage apparatus. Data of one virtual volume is stored in a manner distributed among the storage apparatuses sharing the virtual volume. Accordingly, in the case where a plurality of hosts use an identical virtual volume, access can be distributed so as not to concentrate loads on a controller of one storage apparatus. Even in the case of depleting the free space of one storage apparatus, a free space of another storage apparatus can be used. It is thus advantageous to negate the need to individually manage free spaces for respective storage apparatuses.

For instance, in the virtual storage apparatus, a pool in which the storage areas of respective storage apparatuses are integrated is comprised. A virtual volume based on a thin provisioning technique is created on the pool. The created virtual volume is provided for the host. The host can access data in the virtual volume from any of storage apparatuses sharing the virtual volume. In the case where the storage apparatus receives a read request issued by the host, this storage apparatus identifies which storage apparatus stores the data to be read, acquires the data to be read from the identified storage apparatus and then returns the data to the host. The storage apparatus receives a write request issued by the host, and selects a destination region for the new data from among free regions in all the storage apparatuses sharing the pool if the request is a write request for new data.

Patent Literature 1 discloses a technique of managing paths for a storage apparatus.

CITATION LIST

Patent Literature

[Patent Literature 1]
Japanese Patent Laid-Open No. 2009-259031

SUMMARY OF INVENTION

Technical Problem

The technique of virtualizing storage apparatus facilitates normal operation by virtualization. In contrast, operations requiring consideration of the configuration of storage apparatuses, for instance, relationship of coupling between storages, and relationship of assigning storage areas, sometimes become difficult. For instance, these operations are maintenance operation, failure investigation and the like.

For instance, in a computer system including a plurality of storage apparatuses, a part of storage apparatuses should sometimes be stopped temporarily to perform a maintenance operation, such as update of firmware of the storage apparatus. At this time, an administrator determines a range where devices are affected by stoppage of the storage apparatus (hereinafter referred to as an "affected range") from the configuration of the storage apparatuses. However, in an environment where a technique of virtualizing storage apparatuses has been introduced, the administrator sometimes overestimates the affected range more than necessary.

More specifically, in an environment where the technique of virtualizing storage apparatuses, the storage areas of a plurality of storage apparatuses are assigned to the identical virtual volume. Accordingly, when even any one of the storage apparatuses sharing the virtual volume is stopped, it may be determined that the stoppage affects the entire virtual volume that has relationship of assigning storage areas, that is, all the storage apparatuses sharing the virtual volume. However, for instance, on the basis of a certain situation where the host uses the virtual volume (which part of the virtual volume the host uses, etc.) and of presence or absence of data communication between the storage apparatuses, even storage apparatuses sharing the virtual volume identical to that of the storage apparatus as the stop target are not affected by the stoppage. Wide determination of the affected range increases temporal cost, measures consideration cost and the like in system management. In some cases, the storage apparatus could not be stopped and maintenance operations could not be performed.

Solution to Problem

A management system manages a computer system including a plurality of storage apparatuses, and a server using a virtual volume (virtual logical volume) shared by the storage apparatuses. A storage device of the management system stores access path information. The access path information indicates at least one storage apparatus existing on an access path that is a path from a server to one of the storage apparatuses and that the server uses for accessing the storage area of each of the storage apparatuses. A control device of the management system accepts a selection of a first storage apparatus to be a determination target from among the storage apparatuses, and performs a first determination of whether a first access path including the first storage apparatus exists or not on the basis of the access path information. If the first access path exists, the control device performs a second determination of whether or not the first access path is an active access path that the server uses for accessing the storage area assigned to a part of the virtual volume used by the server, and determines whether the first storage apparatus can be stopped or not on the basis of a result of the first determination or a result of the second determination.

BRIEF DESCRIPTION OF DRAWINGS

FIG. 7 is a diagram of a configuration of an example of a host access path management table according to Embodiment 1.

FIG. 8 is a diagram of a configuration of an example of an inter-device access path management table according to Embodiment 1.

FIG. 9 is a diagram of a configuration of an example of a virtual-real page correspondence management table according to Embodiment 1.

FIG. 11 is a diagram of a configuration of an example of a host management table according to Embodiment 1.

FIG. 12 is a diagram of a configuration of an example of a host access path integration management table according to Embodiment 1.

FIG. 13 is a diagram of a configuration of an example of an inter-device access path integration management table according to Embodiment 1.

FIG. 14 is a diagram of a configuration of an example of a virtual-real page correspondence integration management table according to Embodiment 1.

FIG. 15 is a diagram of a configuration of an example of a VM data integration management table according to Embodiment 1.

FIG. 16 is a diagram of a configuration of an example of an operating VM integration management table according to Embodiment 1.

FIG. 17 is a diagram of a configuration of an example of a VM data access path management table according to Embodiment 1.

FIG. 18 is a diagram of a configuration of an example of an access-inhibited path during stoppage management table according to Embodiment 1.

FIG. 19 is a diagram of a configuration of an example of an operating VM data storing destination management table according to Embodiment 1.

FIG. 20 is a diagram of a configuration of an example of an inhibited migration during stoppage management table according to Embodiment 1.

FIG. 34 is a diagram of a configuration of an example of a physical coupling management table according to Embodiment 2.

FIG. 35 is a diagram of a configuration of an example of a free space management table according to Embodiment 2.

FIG. 36 is a diagram of a configuration of an example of a measures plan management table according to Embodiment 2.

FIG. 37 is a diagram of a configuration of an example of a measures-necessitated volume management table according to Embodiment 2.

FIG. 38 is a diagram of a configuration of an example of a volume space management table according to Embodiment 2.

DESCRIPTION OF EMBODIMENTS

Embodiments of the present invention will now be described with reference to drawings. The embodiments, which will hereinafter be described, do not limit the invention according to claims. Various elements and combination thereof are not necessarily included to solve problems in the present invention. In these drawings, identical signs indicate respective identical configurational elements through the drawings.

In the following description, information of the present invention will be described in representation, such as "aaa table". However, the information may be represented in a structure other than data structures, such as a table, a list, a DB, and a queue. Accordingly, the "aaa table" may be referred to as "aaa information" in order to show independence from the data structure.

Representations of "identification information", "identifier", "notation", "name" and "ID" are used for describing the content of the pieces of information. The representations can be replaced with each other.

In some cases, the following description will be made using a "program" as the subject of a sentence. Since the program is however executed by a processor to perform predetermined processes using a memory and a communication port (a SAN port or a LAN port), the description may be made using the processor as the subject. Processes disclosed using the program as the subject can be represented as processes executed by a computer, such as a management computer. A part of or the entire program may be realized by dedicated hardware. Various programs may be installed in each computer through a program distributing server or a computer-readable storing medium.

A set of at least one computer that manages a computer system and displays display information may hereinafter be referred to as a management system. In the case where a management computer displays display information, the management computer is the management system. A combination of a management computer and a display computer is also a management system. A plurality of computers may realize processes equivalent to those of a management computer for the sake of improving speed and reliability of management processes. In this case, the plurality of computers (in the case where a display computer executes display, the display computer is also included.) is the management system.

Embodiment 1

Figure 1:
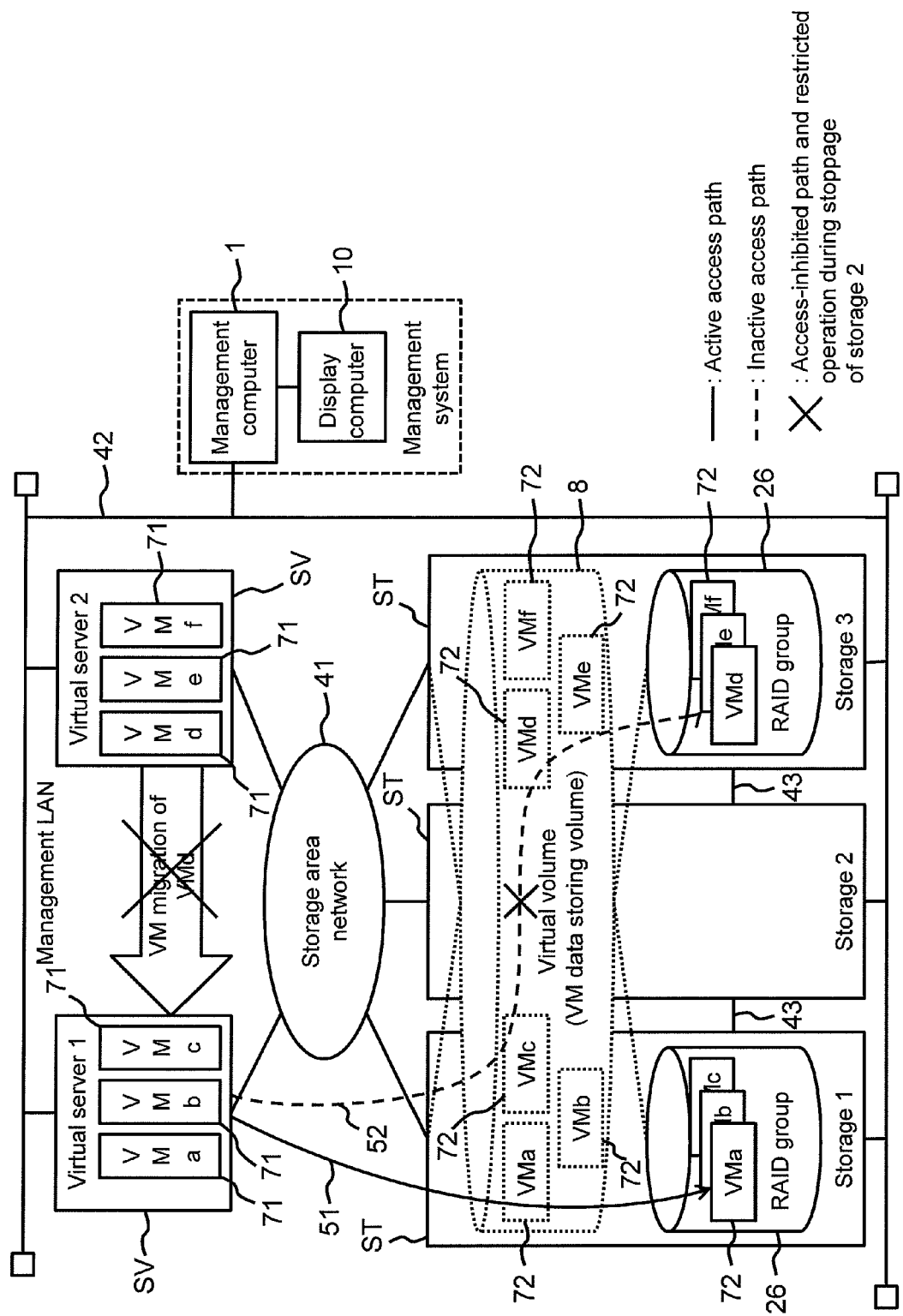
FIG. 1 is a diagram illustrating an overview of Embodiment 1.

FIG. 1 is a diagram illustrating an overview of Embodiment 1.

A management system (management computer 1 and a display computer 10) manages a computer system that includes at least one virtual server SV as a host, and at least one storage apparatus (may be simply referred to as a "storage") ST.

In Embodiment 1, an administrator, who is an operator of the management system, designates the storage apparatus ST (first storage), which is a stop target (determination target) to be stopped for maintenance operation. The management computer 1 identifies an affected range in the case of stopping the storage apparatus ST. First, the management computer 1 determines, using configurational information of the storage apparatus ST, whether an access path (hereinafter referred to as an "access-inhibited path during stoppage") (first access path) that becomes unusable when the storage apparatus ST as the stop target is stopped, exists or not between paths (hereinafter referred to as "VM data access paths" or simply referred to as "access paths") 51 and 52 that are from the virtual server SV to each storage apparatus ST and that the virtual server SV uses when accessing each of the storage apparatuses ST sharing the virtual volume 8. Next, if the access-inhibited path during stoppage exists, the management computer 1 determines whether or not the access-inhibited path during stoppage is active or not, that is, whether the host actually uses the access-inhibited path during stoppage, using the configuration information of the host (virtual server SV). If the access-inhibited path during stoppage does not exist, or the access-inhibited path during stoppage exists but every access-inhibited path during stoppage is inactive, the management computer 1 determines that the storage apparatus ST as the stop target can be stopped. If the active access-inhibited path during stoppage exists, the management computer 1 determines that the storage apparatus ST as the stop target cannot be stopped. Subsequently, the management computer 1 causes the display computer 10 to display a determination result, thereby notifying the administrator. At least one node of the access path may be at least one storage apparatus.

If the management computer 1 determines that the storage apparatus ST as the stop target can be stopped, the management computer 1 asks the administrator whether to subsequently execute a maintenance operation or not. If the administrator issues an instruction to execute the maintenance operation, the management computer 1 actually stops the storage apparatus ST as the stop target and executes the maintenance operation. If the access-inhibited path during stoppage exists but every path is inactive, the management computer 1 identifies an operation (hereinafter referred to as an "limited operation") that is limited by existence of the inactive access-inhibited path during stoppage when the storage apparatus ST as the stop target is stopped and that pertains to change in configuration of the computer system (e.g., change in configuration of the storage apparatus ST, change in configuration of the virtual server SV, etc.). When the management computer 1 notifies the administrator of the determination result, the management computer 1 also notifies the administrator of the content of the limited operation. The administrator verifies the limited operation, and determines whether the limitation is allowable or not. If the limitation is allowable, the administrator instructs the management computer 1 to execute the maintenance operation.

As shown in FIG. 1, the computer system in Embodiment 1 includes two virtual servers SV, or a virtual server 1 and a virtual server 2, and three storage apparatuses ST, or a storage 1, a storage 2 and a storage 3. The virtual server 1, the virtual server 2, the storage 1, the storage 2, and the storage 3 are coupled to each other via a storage area network (SAN) 41. The storage 1 and the storage 2 are coupled to each other via a dedicated line 43. The storage 2 and the storage 3 are coupled to each other via a dedicated line 43. Data communicated between the virtual server SV and the storage apparatus ST is executed via the SAN 41. Meanwhile, data communicated between the storages ST is executed via the dedicated line 43. Data communicated between the storages ST (between the storage 1 and the storage 3) that are not directly coupled to each other via the dedicated line 43, is executed via the other storage ST (storage 2).

Three VMs (virtual machines) 71, or VMa, VMb and VMc, operate on the virtual server 1. Three VMs 71, or VMd, VMe and VMf, operate on the virtual server 2. The storage 1, the storage 2, and the storage 3 share the virtual volume 8 (VM data storing volume), and provides this volume for the virtual server 1 and the virtual server 2. The virtual volume 8 is formed by assigning storage areas of RAID (redundant arrays of inexpensive disks) groups 26 of the storage 1 and the storage 3. The virtual volume 8 stores data (hereinafter referred to as "VM data") 72 used by the VM 71. The virtual server 1 and the virtual server 2 access the virtual volume 8 in order to access the VM data 72 of the VM 71 that operates on these servers.

When the virtual server SV accesses the virtual volume 8, this server issues an access request (a write request or a read request) via one storage apparatus ST as a reception among the storage apparatuses ST sharing the virtual volume 8. The storage apparatus to be the reception will hereinafter be referred to as a "reception storage apparatus". In Embodiment 1, the virtual server 1 regards the storage 1 as the reception storage apparatus ST, and accesses the virtual volume 8 from the storage 1. The virtual server 2 regards the storage 3 as the reception storage apparatus ST, and accesses the virtual, volume 8 from the storage 3. In actuality, the VM data 72 of VMa, VMb, and VMc is stored in the storage area of the RAID group 26 in the storage 1. In actuality, the VM data 72 of the VMd, VMe, and VMf is stored in the storage area of the RAID group 26 in the storage 3.

In such a configuration, when the virtual server 1 accesses the VM data 72 of the VMa, VMb, and VMc, only the storage 1 is engaged in the access. This is because the virtual server 1 accesses the virtual volume 8 from the storage 1, and the VM data 72 of the VMa, VMb, and VMc is stored in the storage area of the RAID group 26 in the storage 1. Meanwhile, when the virtual server 1 accesses the VM data 72 of the VMd, VMe, and VMf, the storage 1, the storage 2, and the storage 3 are engaged in the access. This is because, although the virtual server 1 accesses the VM data storing volume 8 from the storage 1, the VM data 72 of the VMd, VMe, and VMf is stored in the storage area of the RAID group 26 in the storage 3 and the access is made from the storage 1 via the storage 2 to the storage 3.

Here, when the storage 2 is stopped, the access from the virtual server 1 to the VM data 72 of the VMa, VMb, and VMc can steadily be made. This is because the storage 2 is not engaged in the access, that is, the storage 2 does not exist (is not included) on an access path 51 from the virtual server 1 to the storage 1 storing the VM data 72 of the VMa, VMb, and VMc. Meanwhile, access from the virtual server 1 to the VM data 72 of the VMd, VMe, and VMf cannot be made. This is because the storage 2 is engaged in the access, that is, the storage 2 exists on an access path 52 from the virtual server 1 to the storage 3 storing the VM data 72 of the VMd, VMe, and VMf. Accordingly, the access path 52 becomes an access-inhibited path during stoppage. However, even though the access from the virtual server 1 to the VM data 72 of the VMd, VMe, and VMf cannot be made, this does not affect an operation of the VM 71 currently operating on the virtual server 1. This is because the VMd, VMe, and VMf do not operate on the virtual server 1, and the virtual server 1 does not use the VM data 72 of the VMd, VMe, and VMf, that is, the access path 52 is inactive. However, since the access path 52 cannot be used, an operation cannot be executed that, for instance, causes the VMd to migrate from the virtual server 2 to the virtual server 1 during stoppage of the storage 2 and then to operate on the virtual server 1. This becomes a limited operation when the storage 2 is stopped.

The management computer 1 thus determines whether the operation of the VM 71 is affected or not on a combination between each virtual server SV and the VM 71, and notifies the administrator of the determination result. With the configuration in FIG. 1, even when the storage 2 is stopped, the operation of the VM 71 operating on the virtual server 1 and the virtual server 2 are not affected. Accordingly, preliminary measures are unnecessary to stop the storage 2. However, a part of the operation cannot be performed during stoppage. The management computer 1 also notifies the administrator of operations to be inoperable, that is, limited operations.

In this embodiment, the description is made exemplifying the virtual server SV as the host using the storage apparatus ST. However, what is other than the virtual server SV, for instance, a physical server may be the host. In this embodiment, the description is made exemplifying migration (hereinafter referred to as "VM migration") of the VM 71 between the virtual servers SV as the limited operation. However, various limited operations other than the VM migration can be considered. The storage apparatuses ST sharing the virtual volume 8 mean storage apparatuses ST comprising the virtual storage apparatuses. The storage areas of the storage apparatuses ST are not necessarily assigned to the virtual volume 8.

Figure 2:
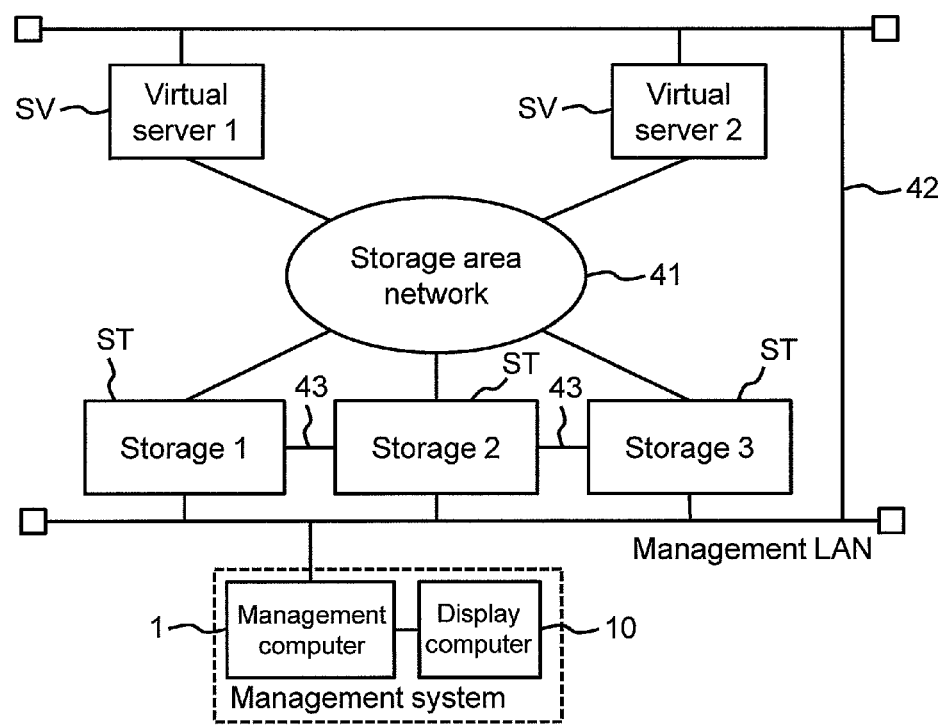
FIG. 2 is a diagram of a configuration of an example of a computer system according to Embodiment 1.

FIG. 2 is a diagram of a configuration of an example of a computer system according to Embodiment 1.

The computer system includes the management computer 1, the display computer 10, at least one (two in this diagram) virtual server SV (the virtual server 1 and the virtual server 2), a plurality of (three in this diagram) storage apparatuses ST (the storage 1, the storage 2, and the storage 3), the SAN 41, and a management LAN (local area network) 42. The virtual server 1, the virtual server 2, the storage 1, the storage 2, and the storage 3 are coupled to each other via the SAN 41. The storage 1 and the storage 2 are coupled to each other via the dedicated line 43. The storage 2 and the storage 3 are coupled to each other via the dedicated line 43. The management computer 1, each virtual server SV and each storage ST are coupled to each other via the management LAN 42. The combination of the management computer 1 and the display computer 10 comprise a management system that manages the computer system. In the case where the management computer 1 also has a function of the display computer 10, the computer system does not necessarily include the display computer 10. In this case, the management computer 1 is the management system. The SAN 41 may adopt a FC (fibre channel) coupling scheme, or an iSCSI (internet small computer system interface) coupling scheme. The computer system according to this embodiment includes the two virtual servers SV, and the three storage apparatuses ST, however, the number of virtual servers SV and the number of storage apparatuses ST are arbitrary.

Figure 3:
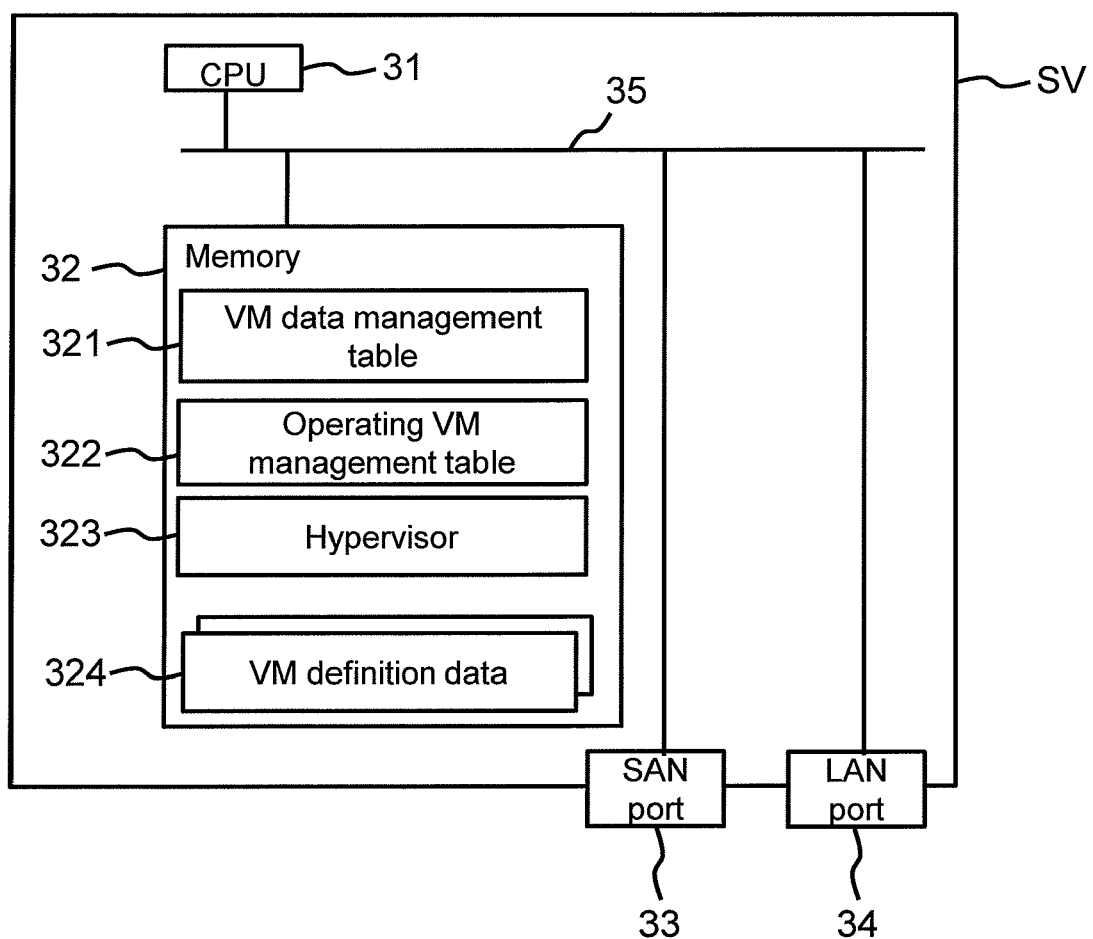
FIG. 3 is a diagram of a configuration of an example of a virtual server according to Embodiment 1.

FIG. 3 is a diagram of a configuration of an example of the virtual server according to Embodiment 1.

The virtual server SV is a computer that executes server programs and the like and provides users with prescribed services. The virtual server SV operates at least one VM 71 thereon to function as at least one virtual server machine. The virtual server SV includes a CPU (central processing unit) 31, a memory 32, a SAN port 33, a LAN port 34, and an internal bus 35. The CPU 31, the memory 32, the SAN port 33, and the LAN port 34 are coupled to each other via the internal bus 35. The CPU 31 executes various programs stored in the memory 32. The memory 32 may be a semiconductor storage apparatus, a secondary storage apparatus, such as a hard disk drive (HDD), or a combination of a semiconductor storage apparatus and a secondary storage apparatus. The SAN port 33 is an interface device for coupling to the SAN 41, and used mainly when user data is input and output. The user data is, for instance, data to be written into the virtual volume 8, data to be read from the virtual volume 8 and the like. The LAN port 34 is an interface device for coupling to the management LAN 42, and used mainly when management data is input and output. The management data is, for instance, configurational information of the computer system or devices comprising the computer system.

The memory 32 stores a VM data management table 321, an operating VM management table 322, a hypervisor 323, and at least one VM definition data 324. The hypervisor 323 is a program for operating the VM 71. The VM definition data 324 is prepared for each VM 71 operating on the virtual server SV, and is information required to operate the VM 71, for instance, data including a space of the memory assigned to the VM 71 and the number of CPUs available for the VM 71. The VM data management table 321 and the operating VM management table 322 will be described later.

Figures 4, 5:
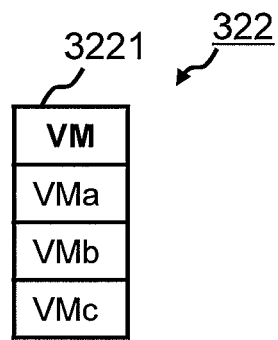
FIG. 4 is a diagram of a configuration of an example of an operating VM management table according to Embodiment 1.
FIG. 5 is a diagram of a configuration of an example of a VM data management table according to Embodiment 1.

FIG. 4 is a diagram of a configuration of an example of the operating VM management table according to Embodiment 1.

The operating VM management table 322 is data for managing the VM operating on the virtual server SV (hereinafter referred to as an "operating VM") 71. The operating VM management table 322 includes a field of a VM 3221. The VM 3221 is stored with the name of the operating VM 71. FIG. 4 shows the operating VM management table 322 stored in the virtual server 1. According to this diagram, it can be understood that the VMa, VMb, and VMc are operating on the virtual server 1.

FIG. 5 is a diagram of a configuration of an example of the VM data management table according to Embodiment 1.

The VM data management table 321 is data for managing the virtual volume 8 storing the VM data 72 for each operating VM 71, and a storing position in the virtual volume 8 at which the VM data 72 is stored. The VM data management table 321 includes fields of a VM 3211, a size 3212, a LUN 3213, and a leading address 3214. The VM 3211 is stored with the name of the operating VM 71. The size 3212 is stored with the size of the VM data 72 of the operating VM 71. The LUN 3213 is stored with the LUN (logical unit number) of the virtual volume 8 in which the VM data 72 of the operating VM 71 is stored. The leading address 3214 is stored with the leading address of a region in the virtual volume 8 where the VM data 72 of the operating VM 71 is stored. For instance, it can be understood, from the first entry from the top in this diagram, that the VM data 72 of the VMa is stored in a region of 100 GB starting from the address of "0x0000" in the virtual volume of "LUN 0". This embodiment assumes that the VM data 72 is sequentially stored in the virtual volume 8. However, the storing scheme of the VM data 72 is not limited thereto. For instance, the VM data 72 may be stored in a manner distributed among pages in the virtual volume 8. In this case, for instance, information identifying each of pages storing the data is managed by the VM data management table 321.

Figure 6:
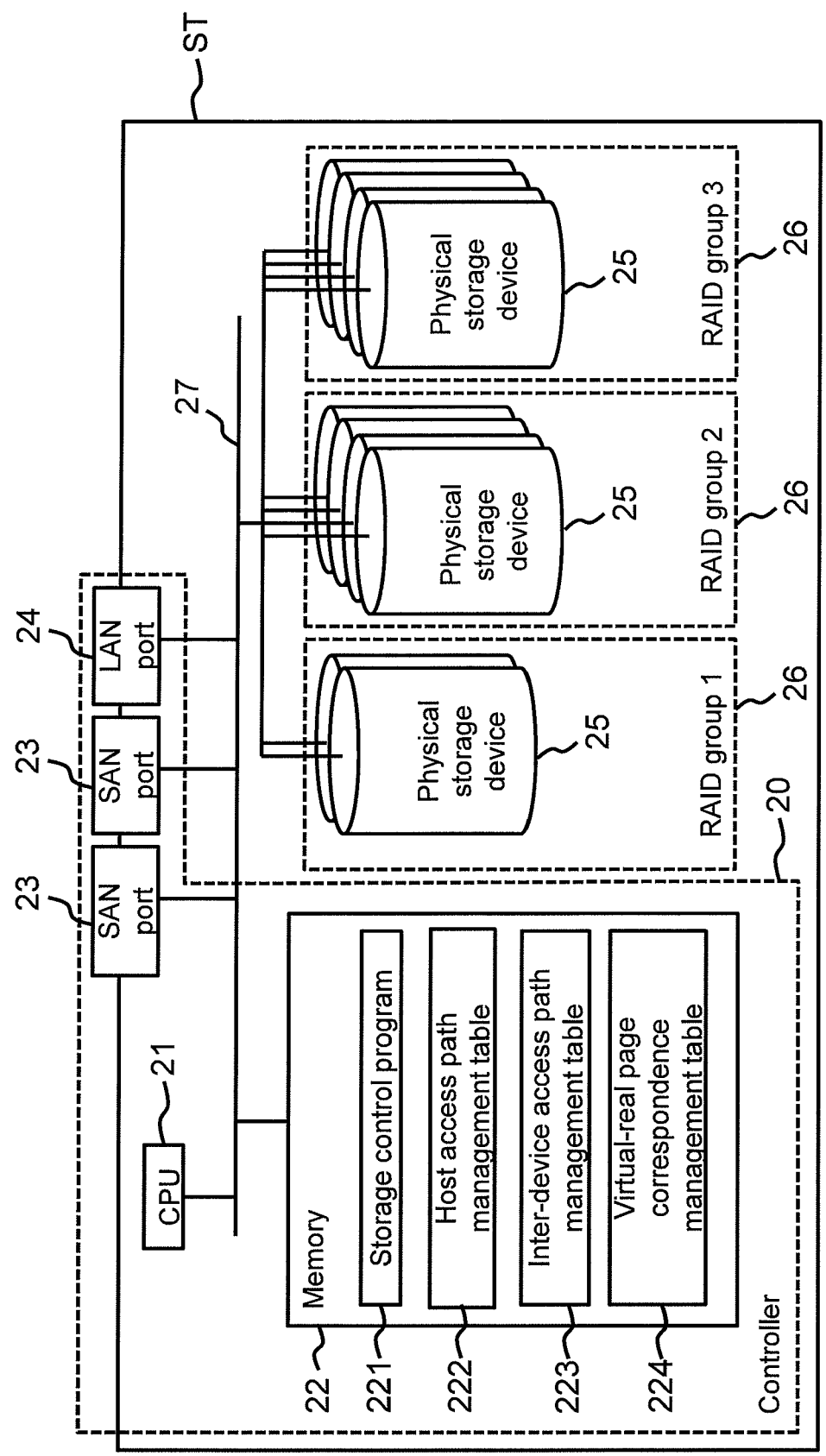
FIG. 6 is a diagram of a configuration of an example of a storage apparatus according to Embodiment 1.

FIG. 6 is a diagram of a configuration of an example of the storage apparatus according to Embodiment 1.

The storage apparatus ST is a device that provides the virtual server SV and the like with storage areas. The storage apparatus ST includes a CPU 21, a memory 22, at least one SAN port 23, a LAN port 24, at least one physical storage device 25, and an internal bus 27. The CPU 21, the memory 22, the SAN port 23, the LAN port 24, and the physical storage device 25 are coupled to each other via the internal bus 27. The CPU 21 executes various programs stored in the memory 22. The physical storage device 25 may be any of a hard disk drive, a solid storing medium, and an optical storing medium, or another type of a storing medium. The at least one RAID group 26 comprises at least one physical storage device 25. The storage area of the RAID group 26, that is, the storage area in the physical storage device 25 comprising the RAID group 26 is assigned to the virtual volume 8. A virtual layer, such as a pool (storage pool) of the storage areas, may intervene between the virtual volume 8 and the RAID group 26. The SAN port 23 is an interface device for coupling to the SAN 41, and used mainly when the user data is input and output. The LAN port 24 is an interface device for coupling to the management LAN 42, and used mainly when the management data is input and output.

The memory 22 stores a storage control program 221, a host access path management table 222, an inter-device access path management table 223, and a virtual-real page correspondence management table 224. The storage control program 221 is a program for controlling the storage apparatus ST. The host access path management table 222 is information (inter-server-storage information) that indicates the virtual server SV regarding the storage apparatus ST storing the host access path management table 222 as a reception, and the virtual volume 8 used by the virtual server SV. The inter-device access path management table 223 is information (inter-storage information) indicating at least one storage apparatus ST existing on a path from the storage apparatus ST storing the inter-device access path management table 223 to another storage apparatus ST. The virtual-real page correspondence management table 224 is information (individual assignment information) indicating to which part (position) of the virtual volume 8, the storage area of the storage apparatus ST storing the virtual-real page correspondence management table 224 is assigned. The details of the host access path management table 222, the inter-device access path management table 223, and the virtual-real page correspondence management table 224 will be described later.

FIG. 7 is a diagram showing a configuration of an example of the host access path management table according to Embodiment 1.

The host access path management table 222 is data for managing the path (hereinafter referred to as a "host access path") that is from the virtual server (hereinafter referred to as a "target virtual server" in the description with reference to FIG. 7) SV regarding the storage apparatus (hereinafter referred to as a "target storage apparatus" in the description with reference to FIG. 7) ST storing the host access path management table 222 as a reception, to the target storage apparatus ST. The host access path management table 222 includes fields of a WWN 2221, a virtual volume ID 2222, a port 2223, and a LUN 2224. The WWN 2221 is stored with the WWN (world wide name) of the SAN port 33 of the target virtual server SV. The virtual volume ID 2222 is stored with the identifier of the virtual volume 8 that the target virtual server SV (more correctly, the operating VM 71 of the target virtual server SV) accesses. The port 2223 is stored with the identifier of the SAN port 23 of the target storage apparatus ST used by the target virtual server SV when accessing the virtual volume 8. The LUN 2224 is stored with the LUN of the virtual volume 8 used by the target virtual server SV when accessing the virtual volume 8. According to this diagram, it can be understood that the virtual server SV having the SAN port "WWN-1" accesses the virtual volume of "Volume 3" by using the SAN port 23 of "Port 11" of the target storage apparatus ST.

FIG. 8 is a diagram of a configuration of an example of the inter-device access path management table according to Embodiment 1.

The inter-device access path management table 223 is data for managing the path (hereinafter referred to as an "inter-device access path") from the storage apparatus (hereinafter referred to as a "target storage apparatus" in the description with reference to FIG. 8) ST storing the inter-device access path management table 223 to another storage device ST sharing the virtual volume 8. The inter-device access path management table 223 includes fields of an access destination storage 2231 and a transit storage 2232. The access destination storage 2231 is stored with the name of the storage apparatus ST as the access destination. The transit storage 2232 is stored with the name of the storage apparatus ST via which the target storage apparatus ST is routed to the storage apparatus ST indicated by the access destination storage 2231 when accessing the indicated storage apparatus (more correctly, data of an access request issued by the target storage apparatus ST passes therethrough). Reference sign "—" in the diagram indicates that there is no storage apparatus ST to be passed through, that is, the target storage apparatus ST directly accesses the storage apparatus ST indicated by the access destination storage 2231. In the case where a plurality of storage apparatuses ST are passed through, the transit storage 2232 is stored with the names of the storage apparatuses ST to be passed through. FIG. 8 shows the inter-device access path management table 223 stored in the storage 1. According to this diagram, it can be understood that the storage 1 directly accesses the storage 2, but accesses the storage 3 via the storage 2.

FIG. 9 is a diagram of a configuration of an example of the virtual-real page correspondence management table according to Embodiment 1.

The virtual-real page correspondence management table 224 is data for managing to which part (position) in the virtual volume 8 the storage area of the storage apparatus (hereinafter referred to as a "target storage apparatus" in the description with reference to FIG. 9) ST storing the virtual-real page correspondence management table 224 is assigned. The virtual-real page correspondence management table 224 manages relationship of correspondence between the virtual page comprising the storage area of the virtual volume 8 and the real page comprising the storage area of the RAID group 26 assigned to the virtual page. The virtual-real page correspondence management table 224 includes fields of a virtual volume ID 2241, an address 2242, a storage 2243, a RAID group 2244, and an address 2245. The virtual volume ID 2241 is stored with the identifier of the virtual volume 8. The address 2242 is stored with the address of the virtual page in the virtual volume 8. The storage 2243 is stored with the name of the target storage apparatus ST. The RAID group 2244 is stored with the name of the RAID group 26 including the real page assigned to the virtual page at the address indicated by the address 2242. The address 2245 is stored with the address of the real page in the RAID group 26, the real page being assigned to the virtual page at the address indicated by the address 2242. For instance, it can be understood that, from the first entry from the top in this diagram, that the real page at the address of "0x0000" in the RAID group 1 in the storage 1 as the target storage apparatus ST is assigned to the virtual page at the address of "0x0000" in the virtual volume of "Volume 3".

Figure 10:
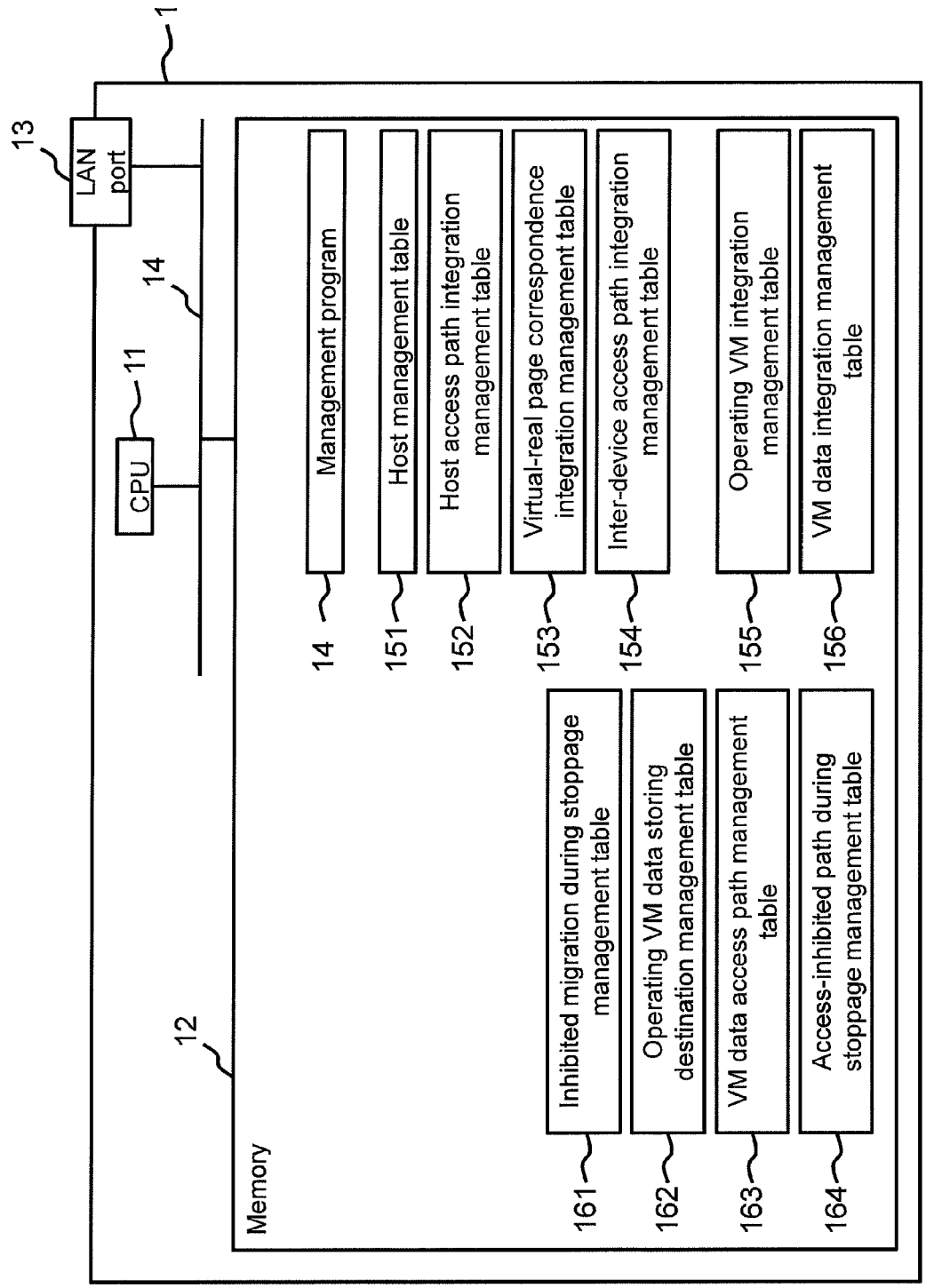
FIG. 10 is a diagram of a configuration of an example of a management computer according to Embodiment 1.

FIG. 10 is a diagram of a configuration of an example of the management computer according to Embodiment 1.

The management computer 1 manages the computer system. The management computer 1 includes a CPU 11, a memory 12, a LAN port 13, and an internal bus 14. The CPU 11, the memory 12, and the LAN port 13 are coupled to each other via the internal bus 14. The CPU 11 executes various programs stored in the memory 12. The memory 12 may be a semiconductor storage apparatus or a secondary storage apparatus, such as a hard disk drive (HDD), or a combination of a semiconductor storage apparatus and a secondary storage apparatus. The memory 12 stores programs executed by the CPU 11, and various pieces of information used by the CPU 11. The LAN port 13 is an interface device for coupling to the management LAN 42.

The memory 12 stores a management program 14, a host management table 151, a host access path integration management table 152, a virtual-real page correspondence integration management table 153, an inter-device access path integration management table 154, an operating VM integration management table 155, a VM data integration management table 156, a inhibited migration during stoppage management table 161, an operating VM data storing destination management table 162, a VM data access path management table 163 and an access-inhibited paths during stoppage management table 164. The management program 14 is a program that executes a process (hereinafter referred to as a "maintenance operation support process") (see FIG. 21) of supporting determination of whether the storage apparatus ST as the stop target can be stopped or not, displaying of a determination result, and other maintenance operations when the management computer 1 accepts a selection of the storage apparatus ST as the stop target from the administrator. The virtual-real page correspondence integration management table 153 is information (assignment information) indicating to which parts in the virtual volume 8 the storage areas of the respective storage apparatuses ST are assigned. The operating VM integration management table 155 and the VM data integration management table 156 are usage information (virtual machine usage information) indicating which part in the virtual volume 8 the virtual server SV (each of the at least one VM 71 operating on the virtual server SV) uses. The VM data access path management table 163 is access path information indicating at least one storage apparatus ST existing on the access path. The details of various pieces of information 151 through 156 and 161 through 164 stored in the memory 12 will be described later.

Input and output into and from management computer 1 by the administrator are performed through the display computer 10 coupled to the management computer 1. The display computer 10 includes, for instance, an input device and an output device. The input device is a device for allowing the administrator to input information into the management computer 1, and, for instance, a keyboard, a mouse and the like. The output device is a device for outputting a result of processes executed by the management computer 1, for instance, a display and the like.

FIG. 11 is a diagram of a configuration of an example of the host management table according to Embodiment 1.

The host management table 151 is data for managing the host existing in the computer system (the virtual server SV in this embodiment). The host management table 151 includes fields of a host 1511, and a WWN 1512. The host 1511 is stored with the name of the virtual server SV. The WWN 1512 is stored with the WWN of the SAN port 33 of the virtual server SV. It is understood, from this diagram, that two virtual servers SV, or the virtual server 1 and the virtual server 2, exist in the computer system, the WWN of the SAN port 33 of the virtual server 1 is "WWN-1", and the WWN of the SAN port 33 of the virtual server 2 is "WWN-2". Data stored in the host management table 151 may be collected by the management computer 1 from each virtual server SV or input by the administrator.

FIG. 12 is a diagram of a configuration of an example of the host access path integration management table according to Embodiment 1.

The host access path integration management table 152 is data that integrates the host access path management tables 222 in the storage apparatuses ST existing in the computer system. The host access paths existing in the computer system are managed by means of the host access path integration management table 152. The host access path integration management table 152 includes fields of a host 1521, a virtual volume ID 1522, a storage 1523, a port 1524 and a LUN 1525. The host 1521 is stored with the name of the virtual server SV. The virtual volume ID 1522 is stored with the identifier of the virtual volume 8 that the virtual server (hereinafter referred to as a "target virtual server" in the description with reference to FIG. 12) SV indicated by the host 1521 accesses. The storage 1523 is stored with the name of the reception storage apparatus ST for the target virtual server SV. The port 1524 is stored with the identifier of the SAN port 23 of the reception storage apparatus ST for the target virtual server SV that the target virtual server SV uses when accessing the virtual volume 8. The LUN 1525 is stored with the LUN of the virtual volume 8 that the target virtual server SV uses when accessing the virtual volume 8. It can be understood, from this diagram, that the virtual server 1 regards the storage 1 as a reception storage apparatus ST and uses the SAN port of "Port 11" of the storage 1 to access the virtual volume of "Volume 3", and the virtual server 2 regards the storage 3 as a reception storage apparatus ST and uses the SAN port of "Port 31" of the storage 3 to access the virtual volume of "Volume 3".

FIG. 13 is a diagram of a configuration of an example of the inter-device access path integration management table according to Embodiment 1.

The inter-device access path integration management table 154 is data that integrates the inter-device access path management tables 223 of the respective storage apparatuses ST existing in the computer system. The inter-device access paths existing in the computer system are managed by means of the inter-device access path integration management table 154. The inter-device access path integration management table 154 includes fields of an access originator storage 1541, an access destination storage 1542, and a transit storage 1543. The access originator storage 1541 is stored with the name of the storage apparatus ST as the access originator. The access destination storage 1542 is stored with the name of the storage apparatus ST as the access destination. The transit storage

1543 is stored with the name of the storage apparatus ST via which the storage apparatus ST indicated by the access originator storage 1541 is routed to the storage apparatus ST indicated by the access destination storage 1542 when accessing the indicated storage apparatus. As with the inter-device access path management table 223, reference sign "—" in the diagram indicates that there is no storage apparatus ST to be passed through. In the case of using a plurality of storage apparatuses ST are passed through, the transit storage 1543 is stored with the names of the storage apparatuses ST. It can be understood, from the first and second entries from the top in this diagram, that the storage 1 directly accesses the storage 2 but accesses the storage 3 via the storage 2. It can be understood, from the third and fourth entries from the top in this diagram, that the storage 2 directly accesses each of the storage 1 and the storage 3. It can be understood, from the first and second entries from the bottom in this diagram, that the storage 3 directly accesses the storage 2 but accesses the storage 1 via the storage 2.

FIG. 14 is a diagram of a configuration of an example of the virtual-real page correspondence integration management table according to Embodiment 1.

The virtual-real page correspondence integration management table 153 is data integrating the virtual-real page correspondence management tables 224 in the respective storage apparatuses ST existing in the computer system. The relationship of correspondence between the virtual page and the real page for each of at least one virtual volume 8 existing in the computer system is managed by means of the virtual-real page correspondence integration management table 153. The virtual-real page correspondence integration management table 153 includes fields of a virtual volume ID 1531, an address 1532, a storage 1533, a RAID group 1534, and an address 1535. The virtual volume ID 1531 is stored with the identifier of the virtual volume 8. The address 1532 is stored with the address of the virtual page in the virtual volume 8. The storage 1533 is stored with the name of the storage apparatus ST including the RAID group 26 including the real page assigned to the virtual page at the address indicated by the address 1532. The RAID group 1534 is stored with the name of the RAID group 26 including the real page assigned to the virtual page at the address indicated by the address 1532. The address 1535 is stored with the address of the real page in the RAID group 26 that is assigned to the virtual page at the address indicated by the address 1532. For instance, it can be understood, from the first entry from the top in this diagram, that the real page at the address of "0x0020" in the RAID group 1 in the storage 1 is assigned to the virtual page at the address of "0x0000" in the virtual volume of "Volume 2".

FIG. 15 is a diagram of a configuration of an example of the VM data integration management table according to Embodiment 1.

The VM data integration management table 156 is data integrating the VM data management tables 321 in at least one virtual server SV existing in the computer system. The virtual volume 8 and the storing position at which the VM data 72 is stored is managed for each operating VM 71 in at least one virtual server SV existing in the computer system by means of the VM data integration management table 156. The VM data integration management table 156 includes fields of a VM 1561, size 1562, a virtual volume ID 1563, and a leading address 1564. The VM 1561 is stored with the name of the operating VM 71. The size 1562 is stored with the size of the VM data 72 of the operating VM 71. The virtual volume ID 1563 is stored with the identifier of the virtual volume 8 in which the VM data 72 of the operating VM 71 is stored. The leading address 1564 is stored with the leading address of the region in the virtual volume 8 where the VM data 72 of the operating VM 71 is stored. For instance, it can be understood that, from the first entry from the top in this diagram, that the VM data 72 of the VMa is stored in a region of 100 GB starting from the address of "0x0000" in the virtual volume of "Volume 3".

FIG. 16 is a diagram of an example of the configuration of the operating VM integration management table according to Embodiment 1.

The operating VM integration management table 155 is data integrating the operating VM management tables 322 of the at least one virtual server SV existing in the computer system. The operating VMs 71 in the at least one virtual server SV existing in the computer system are managed by means of the operating VM integration management table 155. The operating VM integration management table 155 includes fields of a virtual server 1551 and a VM 1552. The virtual server 1551 is stored with the name of the virtual server SV. The VM 1552 is stored with the name of the operating VM 71 of the virtual server SV indicated by the virtual server 1551. It can be understood, from this diagram, that the VMa, VMb, and VMc are operating on the virtual server 1 and the VMd, VMe, and VMf are operating on the virtual server 2.

FIG. 17 is a diagram of a configuration of an example of the VM data access path management table according to Embodiment 1.

The VM data access path management table 163 is data for managing the VM data access paths existing in the computer system. That is, the VM data access paths are from virtual server SV to the respective storage apparatuses ST, and used by the virtual server SV when accessing each of the storage apparatuses ST sharing the virtual volume 8 (more correctly, each storage apparatus ST for which the storage area is assigned to the virtual volume 8, among the storage apparatuses ST sharing the virtual volume 8). For instance, the VM data access path management table 163 is created in the maintenance operation support process after the management computer 1 accepts a selection of the storage apparatus ST as the stop target.

The VM data access path management table 163 includes a virtual server 1631, an access destination storage 1632, a data storing destination storage 1633, and a transit storage 1634. The virtual server 1631 is stored with the name of the virtual server (hereinafter referred to as an "access originator server") SV as the access originator. The access destination storage 1632 is stored with the name of the storage apparatus ST as the access destination viewed from the access originator server SV, that is, the reception storage apparatus ST for the access originator server SV. The data storing destination storage 1633 is stored with the name of the storage apparatus ST in which data used by the access originator server SV (more specifically, the VM data 72 of the operating VM 71 in the access originator server SV) can actually be stored, that is, the storage apparatus ST in which the storage area is assigned to the virtual volume 8 used by the access originator server SV. The storage apparatus ST indicated by the data storing destination storage 1633 is the storage apparatus ST (hereinafter referred to as a "destination storage apparatus") to be the final destination that the access originator server SV accesses via the VM data access path. The transit storage 1634 is stored with the name of the storage apparatus (hereinafter referred to as an "access path transit storage apparatus") ST via which the access originator server SV is routed to, when accessing the destination storage apparatus ST and is other than the reception storage apparatus ST. Reference sign "—" in this diagram indicates that there is no access path transit storage apparatus ST. In the case of being passed through a plurality of storage apparatuses ST in addition to the reception storage apparatus ST, the transit storage 1634 is stored with the names of the respective storage apparatuses ST.

It can be understood, from this diagram, that, in the computer system, four VM data access paths exist. More specifically, VM data access paths are the access path from the virtual server 1 to the storage 1, the access path from the virtual server 1 to the storage 3, the access path from the virtual server 2 to the storage 1, and the access path from the virtual server 2 to the storage 3. Furthermore, it can be understood, from this diagram, that the storage apparatus ST indicated by the access destination storage 1632 (the reception storage apparatus ST for the access originator server SV), the storage apparatus ST indicated by the data storing destination storage 1633 (destination storage apparatus ST), and the storage apparatus ST indicated by the transit storage 1634 (access path transit storage apparatus ST) exist on each VM data access path. For instance, it can be understood, from the second entry from the top in this diagram, that three storage apparatus ST, or the storage 1, the storage 2, and the storage 3, exist on the access path from the virtual server 1 to the storage 3.

FIG. 18 is a diagram of a configuration of an example of the access-inhibited paths during stoppage management table according to Embodiment 1.

The access-inhibited paths during stoppage management table 164 is data for managing the access-inhibited paths during stoppage, that is, VM data access paths that become inoperable when the storage apparatus ST as the stop target is stopped. For instance, the access-inhibited path during stoppage management table 164 is created in the maintenance operation support process after the management computer 1 accepts a selection of the storage apparatus ST as the stop target.

The access-inhibited path during stoppage management table 164 includes fields of a virtual server 1641, an access destination storage 1642, a data storing destination storage 1643, a transit storage 1644, and an active/inactive 1645. The virtual server 1641, the access destination storage 1642, the data storing destination storage 1643, and the transit storage 1644 are fields for identifying the access-inhibited path during stoppage, and substantially identical to the respective fields 1631 to 1634 of the VM data access path management table 163. The virtual server 1641 is stored with the name of the access originator server SV. The access destination storage 1642 is stored with the name of the reception storage apparatus ST for the access originator server SV. The data storing destination storage 1643 is stored with the name of the destination storage apparatus ST. The transit storage 1644 is stored with the name of the access path transit storage apparatus ST. The active/inactive 1645 is stored with data indicating whether the VM data access path is active or not, that is, whether the access originator server SV actually uses the access-inhibited path during stoppage or not. Here, if the VM data 72 of the operating VM 71 in the access originator server SV is stored in the destination storage apparatus ST, the access-inhibited path during stoppage is actually used by the access originator server SV and active. In contrast, if the VM data 72 of the operating VM 71 in the access originator server SV is not stored in the destination storage apparatus ST, the access-inhibited path during stoppage is not actually used by the access originator server SV and inactive.

It can be understood, from this diagram, that two access-inhibited paths during stoppage, that is, the access path from the virtual server 1 to the storage 3 and the access path from the virtual server 2 to the storage 1, exist. Furthermore, it can be understood that, from this diagram, that every inhibited path during stoppage is inactive.

FIG. 19 is a diagram of a configuration of an example of the operating VM data storing destination management table according to Embodiment 1.

The operating VM data storing destination management table 162 is data for managing the storage apparatus ST as the storing destination of the VM data 72 of each operating VM 71 of the virtual server SV (the virtual server SV that is the access originator server SV on the access-inhibited path during stoppage) having the access-inhibited path during stoppage. For instance, the operating VM data storing destination management table 162 is created in the maintenance operation support process after the management computer 1 accepts a selection of the storage apparatus ST as the stop target.

The operating VM data storing destination management table 162 includes fields of a virtual server 1621, a VM 1622, and a data storing destination storage 1623. The virtual server 1621 is stored with the name of the virtual server SV having the access-inhibited path during stoppage. The VM 1622 is stored with the name of the operating VM 71 on the virtual server SV indicated by the virtual server 1621. The data storing destination storage 1623 is stored with the name of the storage apparatus 1623 storing the VM data 72 of the operating VM 71 indicated by the VM 1622. For instance, it can be understood, from the entry from the top in this diagram, that the VM data 72 of the VMa operating on the virtual server 1 is stored in the storage 1.

FIG. 20 is a diagram of a configuration of an example of the inhibited migration during stoppage management table according to Embodiment 1.

The inhibited migration during stoppage management table 161 is data for managing the VM migration to be the limited operation, that is, the VM migration that becomes inoperable when the storage apparatus ST as the stop target is stopped (hereinafter referred to as an "inhibited migration during stoppage"). For instance, the inhibited migration during stoppage management table 161 is created in the maintenance operation support process after the management computer 1 accepts a selection of the storage apparatus ST as the stop target.

The inhibited migration during stoppage management table 161 includes fields of a VM 1611 and a migration destination virtual server 1612. The VM 1611 is stored with the name of the VM 71. The migration destination virtual server 1612 is stored with the name of the virtual server SV as the migration destination. For instance, it can be understood, from this diagram, that there are six inhibited migrations during stoppage, or VM migrations moving the VMa, VMb, and VMc to the virtual server 2 and VM migrations moving the VMd, VMe, and VMf to the virtual server 1. That is, it can be understood that, when the storage apparatus ST as the stop target is stopped, migration from the VMa, VMb, and VMc to the virtual server 2 and migration from the VMd, VMe, and VMf to the virtual server 1 cannot be performed.

Next, an operation of the management computer 1 according to Embodiment 1 will be described.

Figure 21:
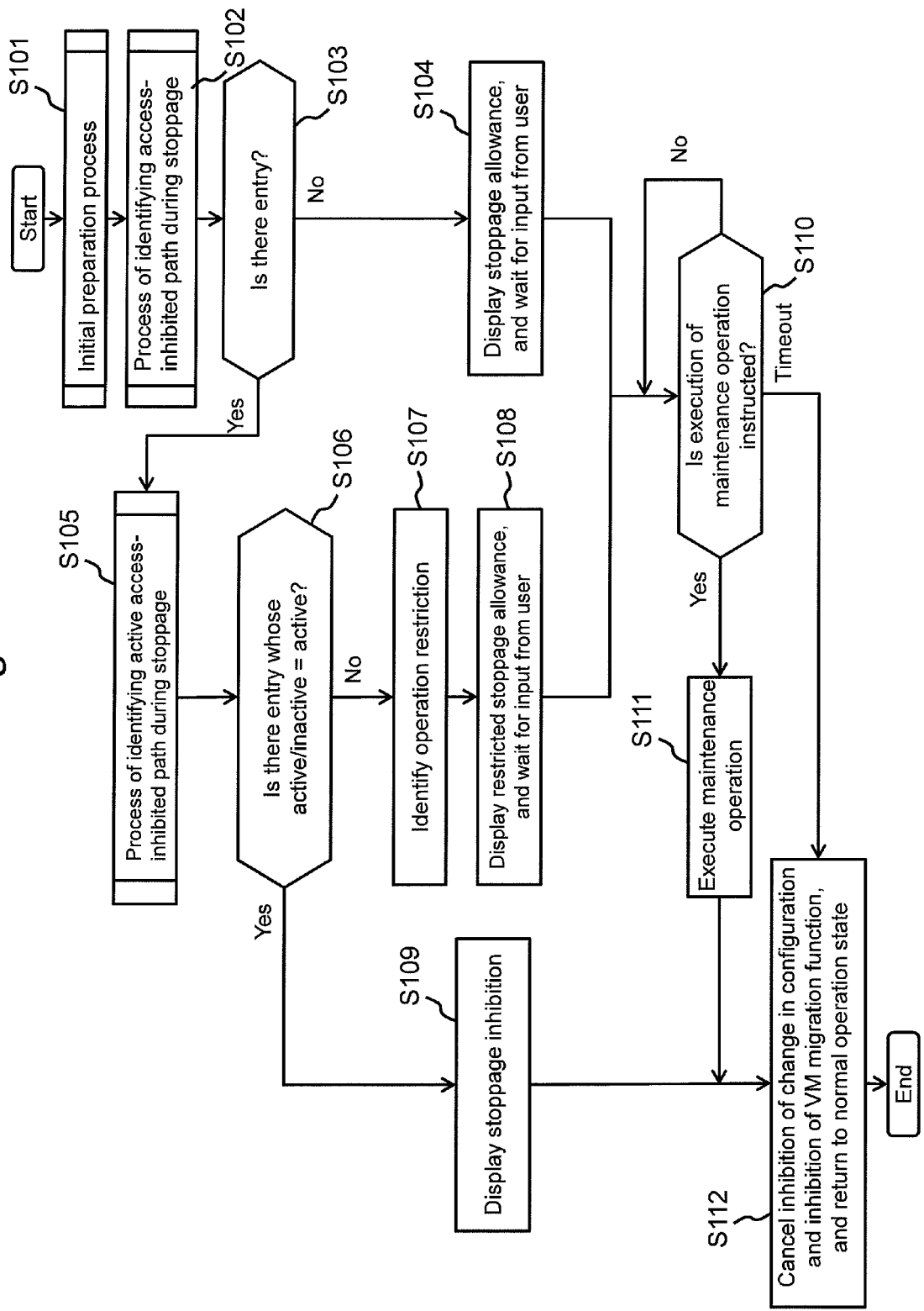
FIG. 21 is a flowchart of a maintenance operation support process according to Embodiment 1.

FIG. 21 is a flowchart of the maintenance operation support process according to Embodiment 1.

The maintenance operation support process is executed when the management computer 1 accepts a selection of the storage apparatus ST as the stop target from the administrator.

First, the management program 14 performs an initial preparation process (see FIG. 22) (step S101). In the initial preparation process, initial preparations for maintenance operation support processes, such as inhibition of change in configuration, inhibition of the VM migration function, and update of various management tables is executed.

Next, the management program 14 performs a process of identifying an access-inhibited path during stoppage (see FIG. 23) (step S102). In the process of identifying an access-inhibited path during stoppage, the access-inhibited path during stoppage currently existing in the computer system is identified, and entries pertaining to the identified access-inhibited path during stoppage are registered in the access-inhibited paths during stoppage management table 164.

Subsequently, the management program 14 determines whether an entry exists in the access-inhibited paths during stoppage management table 164 or not, that is, the access-inhibited path during stoppage exists or not (step S103).

If the access-inhibited path during stoppage does not exist (step S103: No), the management program 14 causes the display computer 10 to display a first determination result display screen indicating that the storage apparatus ST as the stop target can be stopped (see FIG. 29), and advances the processing to step S110 in the state of waiting for an input from the administrator (step S104).

In contrast, if the access-inhibited path during stoppage exists (step S103: Yes), the management program 14 performs a process of identifying an active access-inhibited path during stoppage (FIG. 26) (step S105). In the process of identifying an active access-inhibited path during stoppage, it is determined whether the access-inhibited path during stoppage identified in step S102 is currently active or not, and the active access-inhibited path during stoppage is identified.

Subsequently, the management program 14 refers to the active/inactive 1645 in the access-inhibited paths during stoppage management table 164, and determines an active access-inhibited path during stoppage exists or not (step S106).

If an active access-inhibited path during stoppage exists (step S106: Yes), the management program 14 causes the display computer 10 to display a third determination result display screen (see FIG. 32) indicating that the storage apparatus ST as the stop target cannot be stopped, and advances the processing to step S112 (step S109).

In contrast, if an active access-inhibited path during stoppage does not exist (step S106: No), the management program 14 identifies an inhibited migration during stoppage on the basis of the operating VM data storing destination management table 162 and the access-inhibited paths during stoppage management table 164 (step S107). More specifically, first, the management program 14 refers to the access-inhibited paths during stoppage management table 164 and identifies the virtual server SV having an inactive access-inhibited path during stoppage (i.e., the virtual server SV indicated by the virtual server 1641 of the entry whose active/inactive 1645 stores data indicating inactiveness among the entries registered in the access-inhibited paths during stoppage management table 164). Next, the management program 14 refers to the operating VM data storing destination management table 162 on each identified virtual server (hereinafter referred to as an "identified virtual server" in the description in step S107) SV, and identifies the VM 71 where the destination storage apparatus ST on the inactive access-inhibited path during stoppage that the identified virtual server SV have (hereinafter referred to as an "identified access path" in the description in step S107) is stored with the VM data 72. Here, if the identified VM (hereinafter referred to as an "identified VM" in the description in step S107) 71 is migrated to the identified virtual server SV, the identified access path is actually used by the identified virtual server SV and becomes active; this is because the VM data 72 of the identified VM 71 is stored in the destination storage apparatus ST on the identified access path held by the identified virtual server SV. Accordingly, the management program 14 identifies the VM migration that migrates the identified VM 71 to the identified virtual server SV, as the inhibited migration during stoppage. The management program 14 creates an entry indicating the identified inhibited migration during stoppage, and registers the created entry in the inhibited migration during stoppage management table 161.

Subsequently, the management program 14 causes the display computer 10 to display a second determination result display screen (see FIGS. 30 and 31) indicating that the storage apparatus ST as the stop target can be stopped with operation limitation, and advances the processing to step S110 in the state of waiting an input from the administrator (step S108).

In step S110, the management program 14 waits for an input by the administrator for the first determination result display screen displayed in step S104 or the second determination result display screen displayed in step S108, more specifically, an input of an instruction of executing the maintenance operation. The management program 14 then determines whether the administrator has issued an instruction of executing the maintenance operation or a prescribed time has elapsed without the administrator's issuance of an instruction of executing the maintenance operation.

When the administrator issues an instruction of executing the maintenance operation (step S110: Yes), the management program 14 executes the maintenance operation, for instance, update of the firmware of the storage apparatus ST as the stop target (step S111). Subsequently, the management program 14 advances the processing to step S112.

In contrast, the prescribed time has elapsed without the administrator's issuance of an instruction of executing the maintenance operation (step S110: timeout), the management program 14 advances the processing to step S112.

In step S112, the management program 14 cancels inhibition of change in configuration and inhibition of the VM migration function that has been executed in the initial preparation process, and returns the computer system to the normal operation state. If the management program 14 has not executed inhibition of change in configuration or inhibition of the VM migration function in the initial preparation process, the process in step S112 is not required to be executed. Subsequently, the management program 14 finishes the maintenance operation support process.

Figure 22:
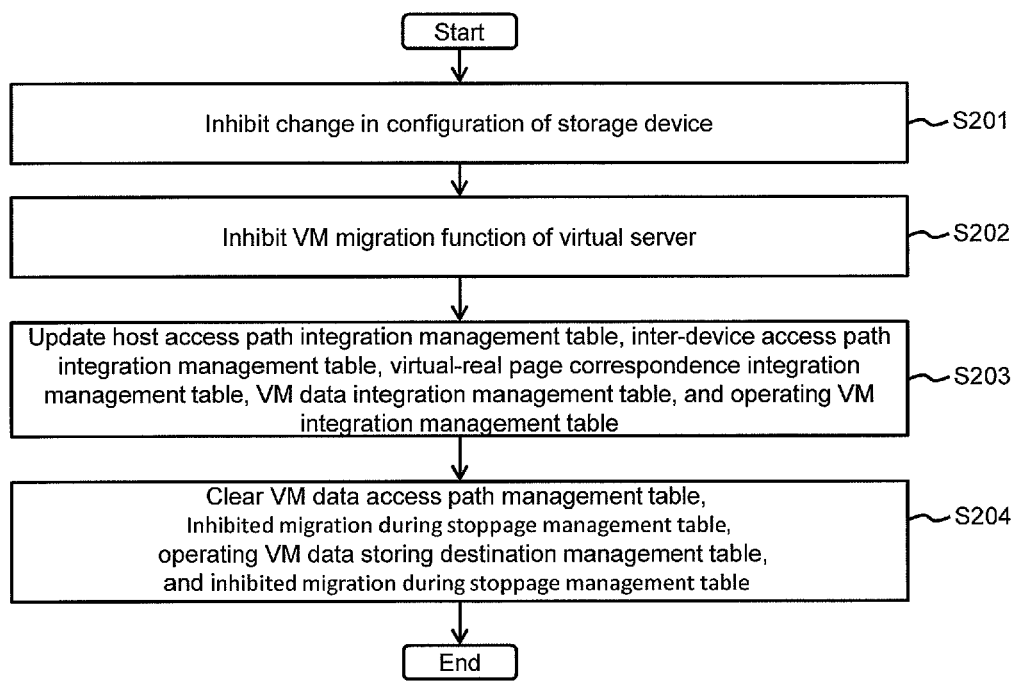
FIG. 22 is a flowchart of an initial preparation process according to Embodiment 1.

FIG. 22 is a flowchart of the initial preparation process according to Embodiment 1.

The initial preparation process corresponds to the process in step S101 in FIG. 21.

First, the management program 14 inhibits change in configuration of the storage apparatus ST, for instance, change in relationship of assignment between the virtual page and the real page (S201).

Next, the management program 14 inhibits the VM migration function of the virtual server SV (step S202). The processes in steps S201 and S202 are performed to prevent the configuration of the storage apparatus ST and the configuration of the virtual server SV from being changed in the following process and causing inconsistency between the processing result and the actual state. In the case where it is preliminarily known that the configuration and the like are not changed, the management program 14 does not necessarily perform these processes.

Subsequently, the management program 14 collects necessary information from the storage apparatus ST and the virtual server SV (more specifically, data of the entire or a part of various management tables stored in each storage apparatus ST and each virtual server SV), and updates the host access path integration management table 152, the virtual-real page correspondence integration management table 153, the inter-device access path integration management table 154, the operating VM integration management table 155, and the VM data integration management table 156 to have content matching with the configuration of the computer system at the present time (step S203).

Subsequently, the management program 14 deletes all the entries in the inhibited migration during stoppage management table 161, the operating VM data storing destination management table 162, the VM data access path management table 163, and the access-inhibited paths during stoppage management table 164 (step S204). The management program 14 then finishes the initial preparation process.

Figure 23:
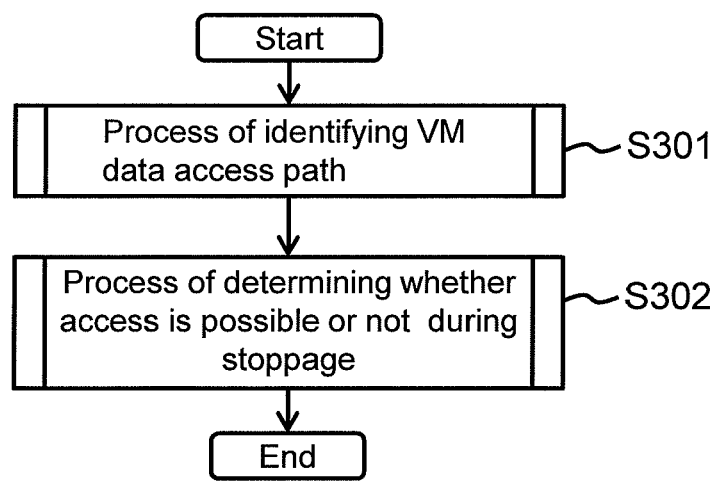
FIG. 23 is a flowchart of a process of identifying an access-inhibited path during stoppage according to Embodiment 1.

FIG. 23 is a flowchart of the process of identifying an access-inhibited path during stoppage according to Embodiment 1.

The process of identifying an access-inhibited path during stoppage corresponds to the process in step S102 in FIG. 21.

First, the management program 14 performs a VM data access path identifying process (see FIG. 24) (step S301). In the VM data access path identifying process, the VM data access path currently existing in the computer system is identified.

Next, the management program 14 performs a process of determining whether access is possible or not during stoppage (see FIG. 25) (step S302). In this process of determining whether access is possible or not during stoppage, it is determined whether the VM data access path identified in step S301 is access-inhibited path during stoppage or not. Subsequently, the management program 14 finishes the process of identifying an access-inhibited path during stoppage.

Figure 24:
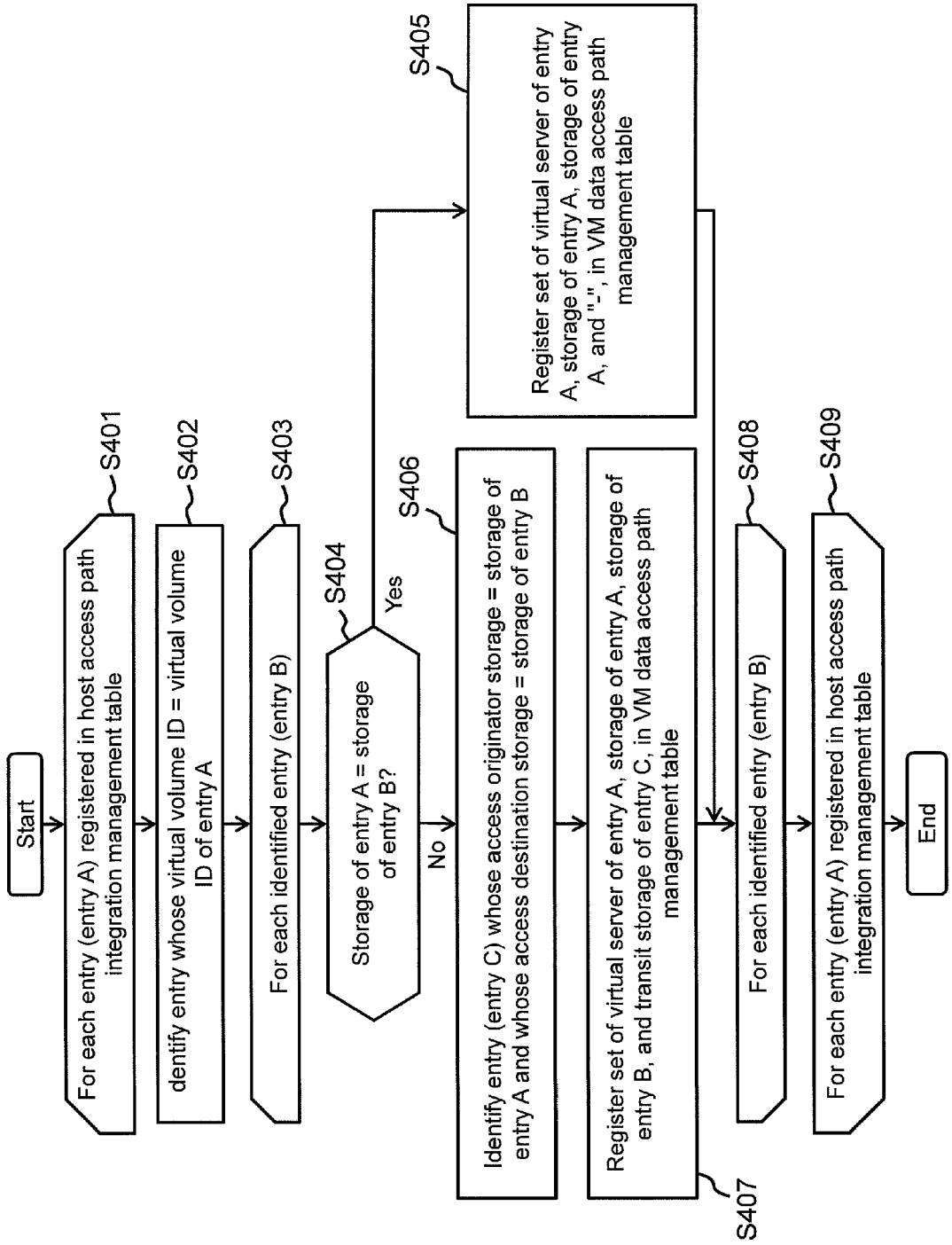
FIG. 24 is a flowchart of a VM data access path identifying process according to Embodiment 1.

FIG. 24 is a flowchart the VM data access path identifying process according to Embodiment 1.

The VM data access path identifying process corresponds to the process in step S301 in FIG. 23.

The management program 14 executes the processes in steps S401 to S409 on each entry registered in the host access path integration management table 152. The management program 14 selects one entry (hereinafter referred to as an "entry A" in the description with reference to FIG. 24) from the entries registered in the host access path integration management table 152.

The management program 14 identifies an entry whose virtual volume ID 1531 has a value matching with the value of the virtual volume ID 1522 of the entry A among the entries in the virtual-real page correspondence integration management table 153 (step S402). That is, in step S402, The management program 14 identifies the entry pertaining to the virtual volume (hereinafter referred to as a "target virtual volume" in the description with reference to FIG. 24) 8 used by the virtual server SV (more correctly, the virtual server SV indicated by the host 1521 of the entry A) of the entry A in the virtual-real page correspondence integration management table 153. The management program 14 can know which real page in the storage apparatus ST is assigned to the target virtual volume by referring to the identified entry.

The management program 14 executes the processes in steps S403 to S408 on each entry identified in step S402. The management program 14 selects one entry (hereinafter referred to as an "entry B" in the description with reference to FIG. 24) from among the entries identified in step S402.

The management program 14 determines whether the storage apparatus ST of the entry A (more correctly, the storage apparatus ST indicated by the storage 1523 of the entry A) matches with the storage apparatus ST of the entry B (more correctly, the storage apparatus ST indicated by the storage 1533 of the entry B) or not (step S404). That is, in step S404, The management program 14 determines whether the storage apparatus ST (the storage apparatus ST of the entry B) having the real page assigned to the target virtual volume 8 is the reception storage apparatus (the storage apparatus ST of the entry A) of the virtual server SV of the entry A or not.

If the storage apparatus ST of the entry A matches with the storage apparatus ST of the entry B (step S404: Yes), the management program 14 creates an entry in the VM data access path management table 163 where the virtual server 1631 is stored with the name of the virtual server SV of the entry A, the access destination storage 1632 is stored with the name of the storage apparatus ST of the entry A, the data storing destination storage 1633 is stored with the name of the storage apparatus ST of the entry A, and the transit storage 1634 is stored with "—", and registers the created entry in the management table 163 (step S405). That is, if the storage apparatus ST of the entry B is the reception storage apparatus ST of the virtual server SV of the entry A, the VM data access path is identified in which the virtual server SV of the entry A is regarded as the access originator server SV, the storage apparatus ST of the entry A is regarded as the reception storage apparatus ST and the destination storage apparatus ST, and which has no access path transit storage apparatus ST. If the same entry has already been in the VM data access path management table 163, the entry is not required to be created and registered.

If the storage apparatus ST of the entry A does not match with the storage apparatus ST of the entry B (step S404: No), the management program 14 identifies entry (hereinafter referred to as an "entry C" in the description with reference to FIG. 24) where the value of the access originator storage 1541 matches with the value of the storage 1523 of the entry A, and the value of the access destination storage 1542 matches with the value of the storage 1533 of the entry B, from the inter-device access path integration management table 154 (step S406). That is, in step S406, the management program 14 identifies the entry indicating the inter-device access path from the storage apparatus ST of the entry A to the storage apparatus ST of the entry B.

Subsequently, the management program 14 creates an entry in the VM data access path management table 163 where the virtual server 1631 is stored with the name of the virtual server SV of the entry A, the access destination storage 1632 is stored with the name of the storage apparatus ST of the entry A, the data storing destination storage 1633 is stored with the name of the storage apparatus ST of the entry B, the transit storage 1634 is stored with the storage apparatus ST indicated by the transit storage 1543 of the entry C (in the case of a plurality of storage apparatuses, all the storage apparatuses), and registers the created entry in the management table 163 (step S407). That is, if the storage apparatus ST of the entry B is not the reception storage apparatus ST of the virtual server SV of the entry A, the VM data access path is identified in which the virtual server SV of the entry A is regarded as the access originator server SV, the storage apparatus ST of the entry A is regarded as the reception storage apparatus ST, the storage apparatus ST of the entry B is regarded as the destination storage apparatus ST, and the storage apparatus ST indicated by the transit storage 1543 of the entry C is regarded as the access path transit storage apparatus ST. If the same entry has already been in the VM data access path management table 163, the entry is not required to be created or registered.

The management program 14 completes the processes in steps S403 to S408 on each entry identified in step S402 and the processes in steps S401 to S409 on each entry registered in the host access path integration management table 152, and subsequently finishes the VM data access path identifying process.

Figure 25:
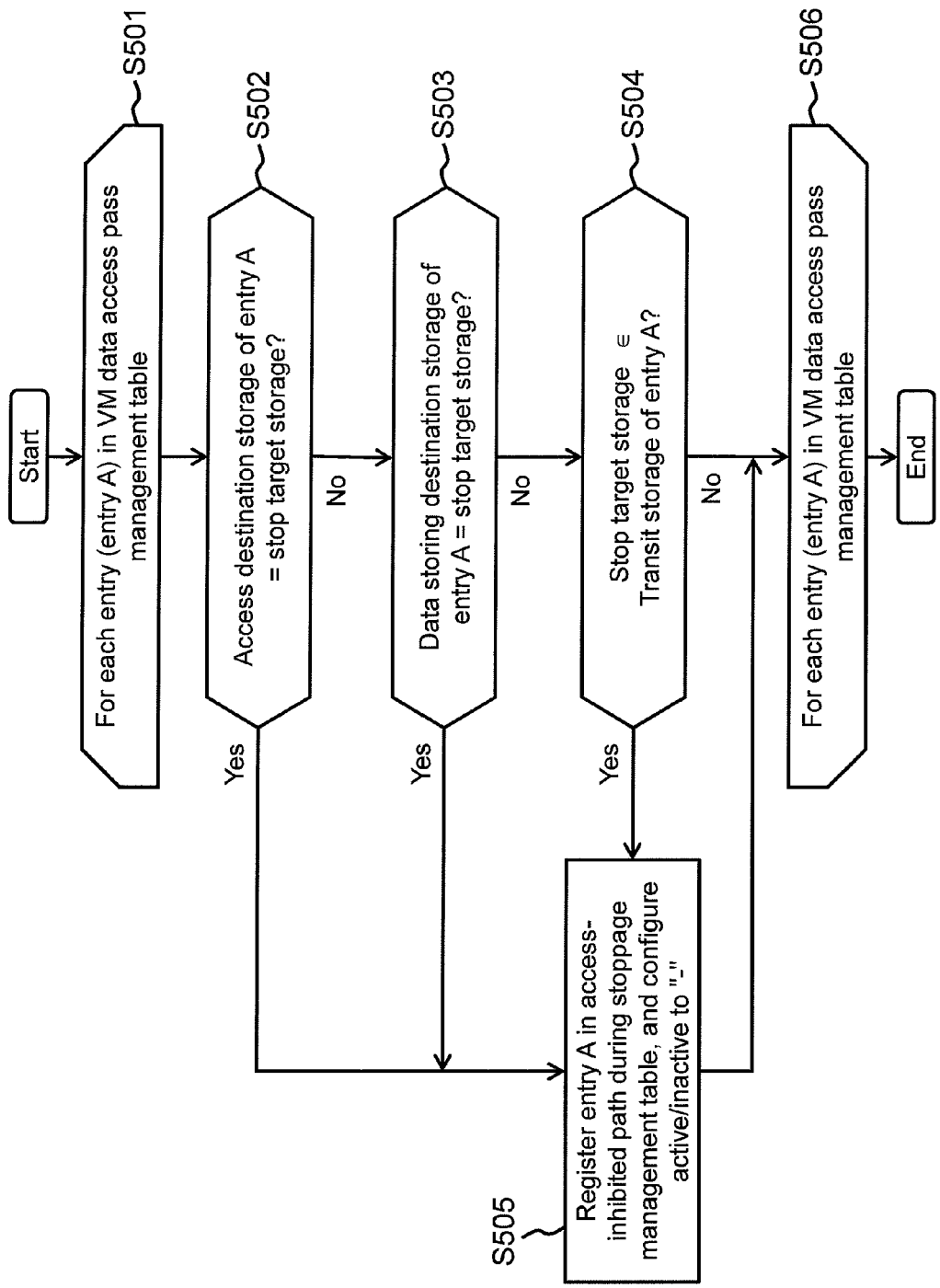
FIG. 25 is a flowchart of a process of determining whether access is possible or not during stoppage according to Embodiment 1.

FIG. 25 is a flowchart of the process of determining whether access is possible or not during stoppage according to Embodiment 1.

The process of determining whether access is possible or not during stoppage corresponds to step S302 in FIG. 23.

The management program 14 executes the processes in steps S501 to S506 on each entry registered in the VM data access path management table 163. The management program 14 selects one entry (hereinafter referred to as an "entry A" in the description with reference to FIG. 25) among the entries registered in the VM data access path management table 163. Hereinafter, in the description with reference to FIG. 25, the VM data access path indicated by the entry A is referred to as a "target VM data access path".

The management program 14 determines whether the storage apparatus ST indicated by the access destination storage 1632 of the entry A, that is, the reception storage apparatus ST for the access originator server SV on the target VM data access path, is the storage apparatus ST as the stop target or not (step S502).

If the storage apparatus ST indicated by the access destination storage 1632 of the entry A is not the storage apparatus ST as the stop target (step S502: No), the management program 14 determines whether the storage apparatus ST indicated by the data storing destination storage 1633 of the entry A, that is, the destination storage apparatus ST on the target VM data access path, is the storage apparatus ST as the stop target or not (step S503).

If the storage apparatus ST indicated by the data storing destination storage 1633 of the entry A is not the storage apparatus ST as the stop target (step S503: No), the management program 14 determines whether the storage apparatus ST indicated by the transit storage 1634 of the entry A, that is, the access path transit storage apparatus ST on the target VM data access path, is the storage apparatus ST as the stop target or not (step S504).

In the case where the storage apparatus ST indicated by the access destination storage 1632 of the entry A is determined to be the storage apparatus ST as the stop target in step S502 (step S502: Yes), the case where the storage apparatus ST indicated by the data storing destination storage 1633 of the entry A is determined to be the storage apparatus ST as the stop target step S503 (step S503: Yes), or the case where any of the storage apparatuses ST indicated by the transit storage 1634 of the entry A is determined to be the storage apparatus ST as the stop target in step S504 (step S504: Yes), the management program 14 creates an entry of the access-inhibited paths during stoppage management table 164 where the virtual server 1641, the access destination storage 1642, the data storing destination storage 1643 and the transit storage 1644 are stored with the values of the virtual server 1631, the access destination storage 1632, the data storing destination storage 1633, and the transit storage 1634 of the entry A, respectively, and the active/inactive 1645 is stored with "—", and registers the created entry in the access-inhibited paths during stoppage management table 164. In other words, in this case, the VM data access path indicated by the entry A is determined to be the access-inhibited path during stoppage, the entry pertaining to the VM data access path indicated by the entry A is registered in the access-inhibited paths during stoppage management table 164. The value of "—" of the active/inactive 1645 indicates it has not been determined yet whether the access-inhibited path during stoppage is active or not.

In contrast, if all the storage apparatuses ST indicated by the transit storage 1634 of the entry A are not the storage apparatus ST as the stop target (step S504: No), the management program 14 determines that the VM data access path indicated by the entry A is not the access-inhibited path during stoppage, and finishes the process on the entry A.

The management program 14 completes the processes in steps S501 to S506 on each entry registered in the VM data access path management table 163, and subsequently finishes the process of determining whether access is possible or not during stoppage.

Thus, the management computer 1 determines whether or not the storage apparatus ST as the stop target exists on each VM data access path existing in the computer system. If the storage apparatus ST as the stop target exists, the management computer 1 determines that the VM data access path is the access-inhibited path during stoppage.

Figure 26:
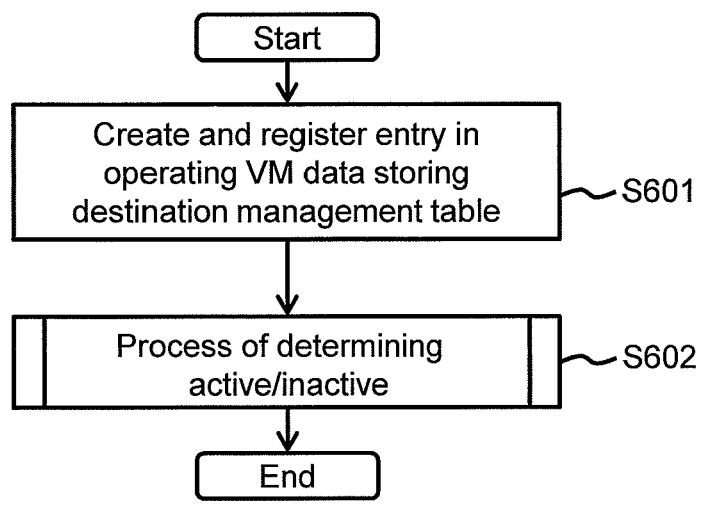
FIG. 26 is a flowchart of a process of identifying an active access-inhibited path during stoppage according to Embodiment 1.

FIG. 26 is a flowchart of the process of identifying an active access-inhibited path during stoppage according to Embodiment 1.

The process of identifying an active access-inhibited path during stoppage corresponds to the process in step S105 in FIG. 21.

First, the management program 14 creates an entry in the operating VM data storing destination management table 162 on the basis of the virtual-real page correspondence integration management table 153, the operating VM integration management table 155, the VM data integration management table 156, and the access-inhibited paths during stoppage management table 164, and registers the created entry in the operating VM data storing destination management table 162 (step S601). More specifically, first, the management program 14 refers to the operating VM integration management table 155 and the access-inhibited paths during stoppage management table 164, and identifies the virtual server SV having the access-inhibited path during stoppage (i.e., the virtual server SV indicated by the virtual server 1641 of the access-inhibited paths during stoppage management table 164) and its operating VM 71. Next, the management program 14 refers to the VM data integration management table 156, and identifies the storing position of the VM data 72 in the virtual volume 8 on each operating VM 71 of the virtual server SV having the access-inhibited path during stoppage. The management program 14 then identifies the storage apparatus ST storing the VM data 72, on each operating VM 71 of the virtual server SV having the access-inhibited path during stoppage, on the basis of the storing position of the VM data 72 in the virtual volume 8 and the relationship of assignment between the virtual page and the real page that is indicated by the virtual-real page correspondence integration management table 153. The management program 14 creates an entry on each combination of the identified virtual server SV having the access-inhibited path during stoppage, the operating VM 71, and the storage apparatus ST storing the VM data 72 of the operating VM 71, and registers the created entry in the operating VM data storing destination management table 162.

Next, the management program 14 executes an active/inactive determination process on the access-inhibited path during stoppage (step S602). In this active/inactive determination process, it is determined whether the access-inhibited path during stoppage is currently active or not. Subsequently, the management program 14 finishes the process of identifying an active access-inhibited path during stoppage.

Figure 27:
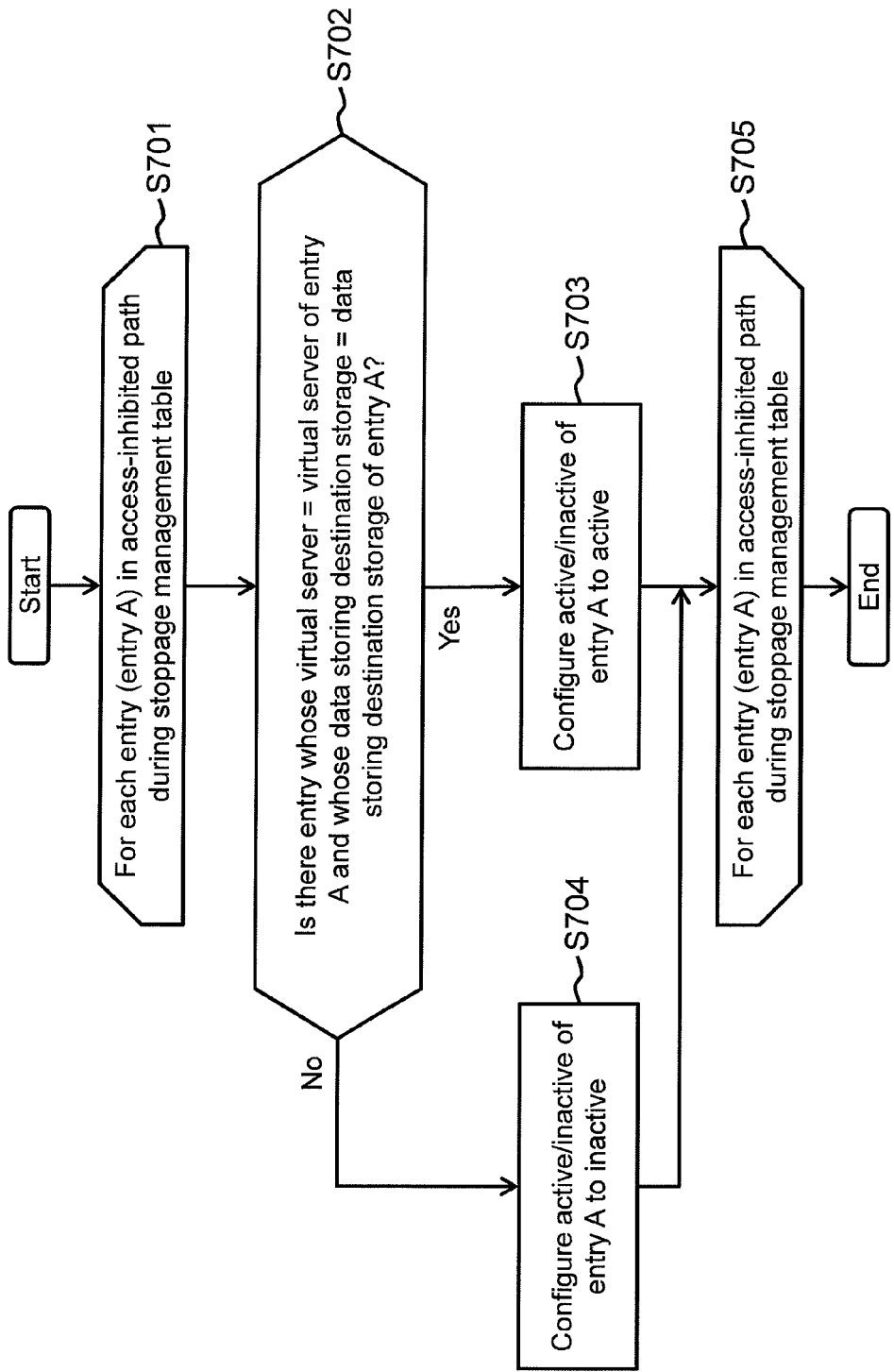
FIG. 27 is a flowchart of an active/inactive determination process according to Embodiment 1.

FIG. 27 is a flowchart of the active/inactive determination process according to Embodiment 1.

The management program 14 executes the steps S701 to S705 on each entry registered in the access-inhibited paths during stoppage management table 164. The management program 14 selects one entry (hereinafter referred to as an "entry A" in the description with reference to FIG. 27) from among the entries registered in the access-inhibited paths during stoppage management table 164.

The management program 14 determines whether or not an entry exists whose virtual server 1621 has a value matching with the value of the virtual server 1641 of the entry A and whose data storing destination storage 1623 has a value matching with the value of the data storing destination storage 1643 of the entry A in the operating VM data storing destination management table 162 (step S702). That is, in step S702, the management program 14 determines whether the VM data 72 of the operating VM 71 on the access originator server SV on the access path is stored in the destination storage apparatus ST on the access-inhibited path during stoppage indicated by the entry A or not, that is, whether the access-inhibited path during stoppage indicated by the entry A is actually used by the access originator server SV on the access path or not.

In the case where the operating VM data storing destination management table 162 includes an entry whose virtual server 1621 has the value matching with the virtual server 1641 of the entry A and whose data storing destination storage 1623 has a value matching with the value of the data storing destination storage 1643 of the entry A, that is, the case where the access-inhibited path during stoppage indicated by the entry A is actually used by the access originator server SV on the access path (step S702: Yes), the management program 14 stores data indicating activeness in the active/inactive 1645 of the entry A (step S703).

In contrast, in the case where the operating VM data storing destination management table 162 does not include an entry whose virtual server 1621 has a value matching with the value of the virtual server 1641 of the entry A and whose data storing destination storage 1623 has a value matching with the value of the data storing destination storage 1643 of the entry A, that is, the case where the access-inhibited path during stoppage indicated by the entry A is not actually used by the access originator server SV on the access path (step S702: No), the management program 14 stores data indicating inactiveness in the active/inactive 1645 of the entry A (step S704).

The management program 14 completes the processes in step S701 to S705 on each entry registered in the access-inhibited paths during stoppage management table 164, and subsequently finishes the active/inactive determination process.

Thus, the management computer 1 determines whether the VM data 72 of the operating VM 71 of the access originator server SV on the access path on each access-inhibited path during stoppage is stored in the destination storage apparatus ST on the access path or not. If the data is stored, the management computer 1 determines that the access-inhibited path during stoppage is active. If the data is not stored, the management computer 1 determines that the access-inhibited path during stoppage is inactive.

Next, a screen for allowing the administrator to execute the maintenance operation support process and a screen displayed on the maintenance operation support process will be described. This embodiment will describe examples of the screens in the case where the maintenance operation is update of the firmware of the storage apparatus ST. The layout and function of the screen are not limited to the layout and the like described in the embodiment. For instance, in the cases of a maintenance operation, a failure investigation and the like that are other than the update of the firmware of the storage apparatus ST, the screens are configured to be suitable for supporting the maintenance operations and the like. The management computer 1 may solely provide a function of determining whether the storage apparatus ST selected by the administrator can be stopped or not (hereinafter referred to as "determination of whether stoppage is possible or not"). In this case, a common screen is displayed for every maintenance operation including the result of the determination of whether stoppage is possible or not. An advantage of adopting a screen layout specialized in a certain maintenance operation is to allow the administrator to operate intuitively. Meanwhile, an advantage of adopting a common screen among all the maintenance operations is to enable the storage apparatus ST to be used in every scene requiring stoppage.

Figure 28:
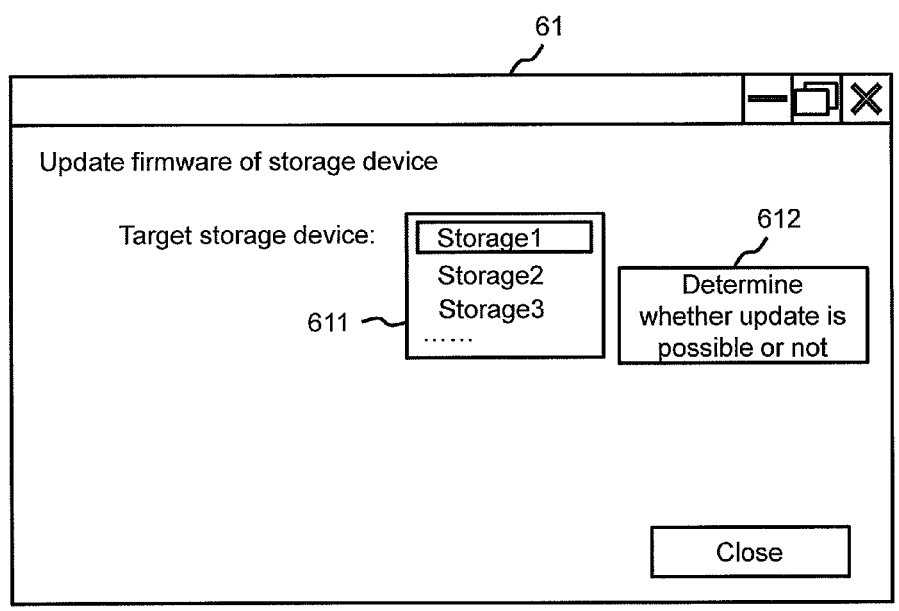
FIG. 28 is a diagram of a configuration of an example of an initial screen according to Embodiment 1.

FIG. 28 is a diagram of a configuration of an example of an initial screen according to Embodiment 1.

The initial screen 61 is a screen for allowing the administrator, who intends to perform a maintenance operation, to select a storage apparatus ST as the stop target for the maintenance operation. The initial screen 61 includes a region 611 for allowing the administrator to select the storage apparatus ST as the stop target, and a button 612 for causing the management computer 1 to execute the determination of whether stoppage is possible or not (the maintenance operation support process in this embodiment). For instance, a list of the names of storage apparatuses ST comprising the computer system is displayed on the region 611.

Figure 29:
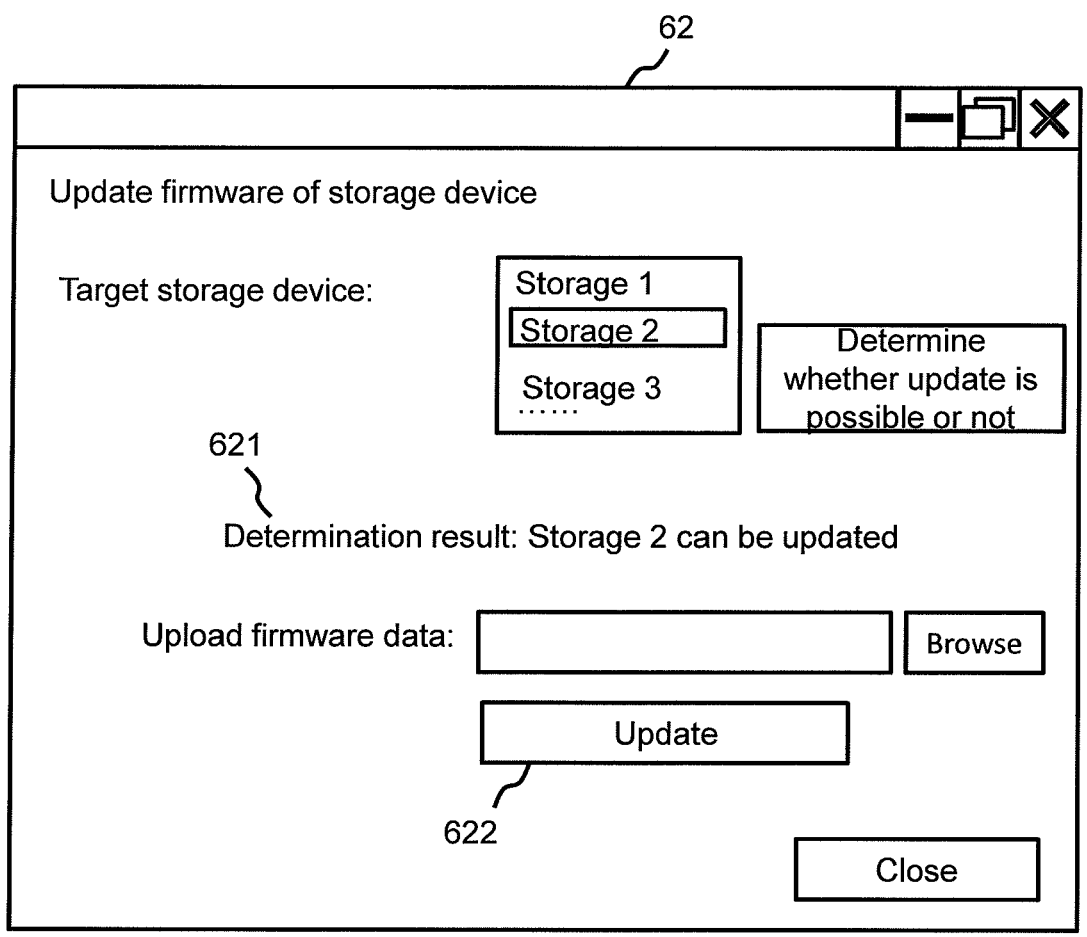
FIG. 29 is a diagram of a configuration of an example of a first determination result display screen according to Embodiment 1.

FIG. 29 is a diagram of a configuration of an example of the first determination result display screen according to Embodiment 1.

The first determination result display screen 62 is a screen for notifying the administrator of determination if the management computer 1 determines that the storage apparatus ST as the stop target can be stopped in the maintenance operation support process (step S104 in FIG. 21). The first determination result display screen 62 includes a region 621 for displaying the result of a determination of whether stoppage is possible or not, and a button 622 for allowing the administrator to issue an instruction of firmware update, which is a maintenance operation. The content representing that the storage apparatus ST as the stop target (the storage 2 in the example in FIG. 29) can be stopped ("Storage 2 can be updated" in the example in FIG. 29) is displayed on the region 621. When the administrator designates firmware data to be uploaded and presses the button 622, the management computer 1 starts the process in step S111 in the maintenance operation support process and performs the maintenance operation, that is, update of the firmware of the storage apparatus ST as the stop target.

The administrator refers to the region 621 to thereby know that the storage apparatus ST as the stop target can be stopped without specifically taking any measures.

Figure 30:
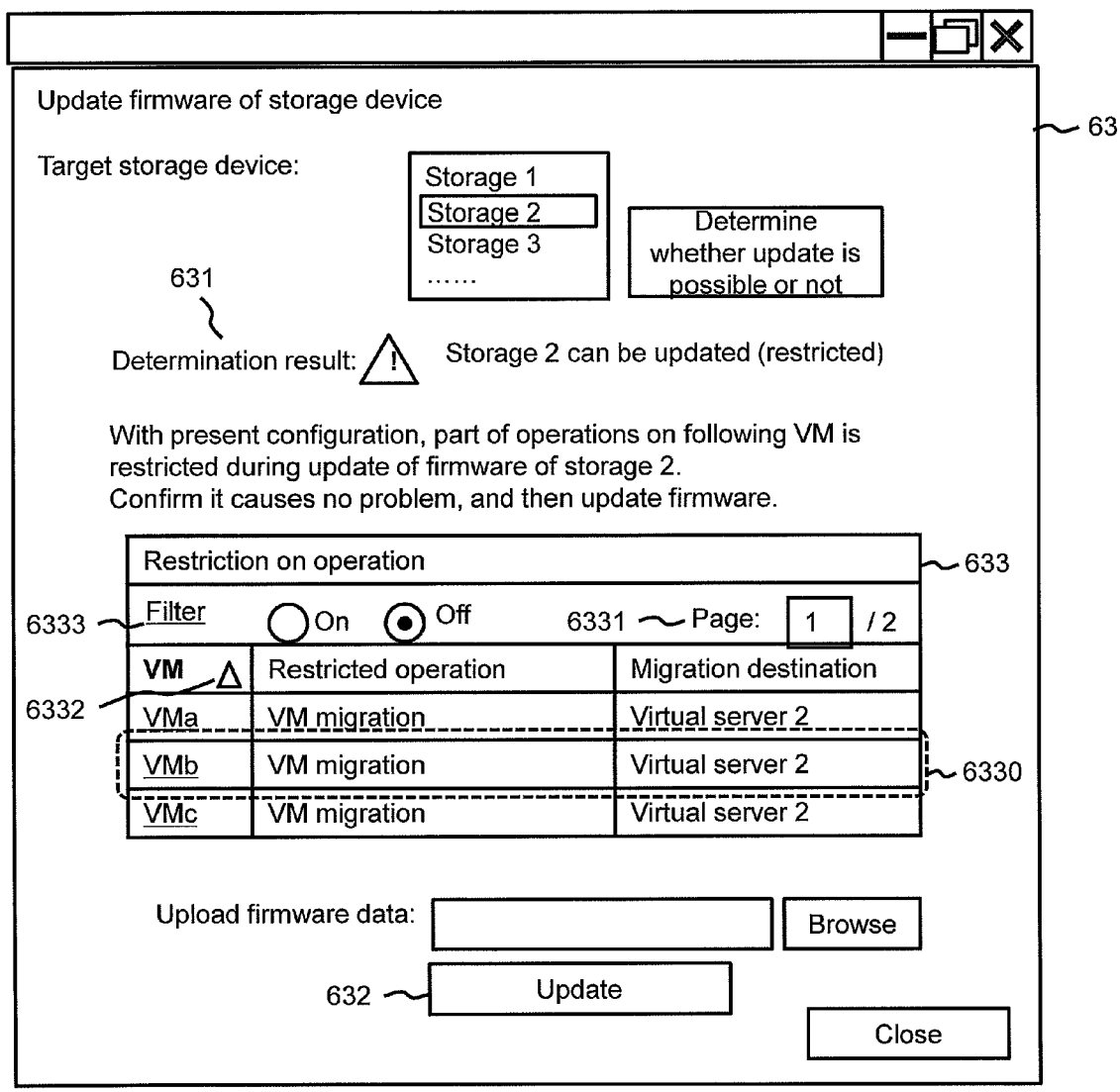
FIG. 30 is a diagram of a configuration of a first example of a second determination result display screen according to Embodiment 1.
Figure 31:
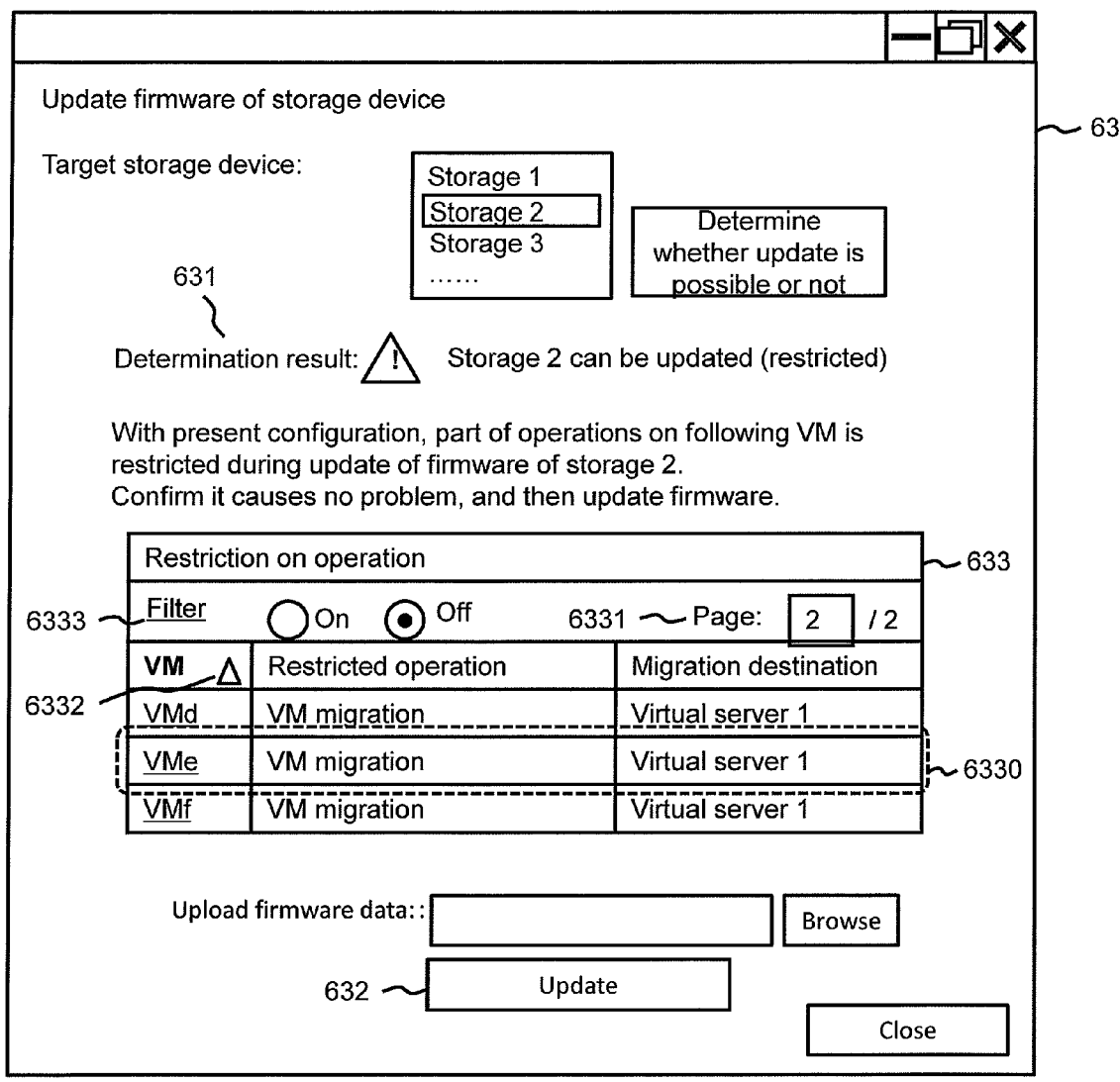
FIG. 31 is a diagram of a configuration of a second example of the second determination result display screen according to Embodiment 1.

FIG. 30 is a diagram of a configuration of a first example of the second determination result display screen according to Embodiment 1. FIG. 31 is a diagram of a configuration of a second example of the second determination result display screen according to Embodiment 1.

The second determination result display screen 63 is a screen for notifying the administrator of determination if the management computer 1 determines that the storage apparatus ST as the stop target can be stopped with the limited operation in the maintenance operation support process (step S108 in FIG. 21). The second determination result display screen 63 includes a region 631 for displaying the result of a determination of whether stoppage is possible or not, a button 632 for allowing the administrator to issue an instruction of an maintenance operation, which is firmware update, and a region 633 for displaying the content of the limited operation. The regions 631 and 632 are substantially identical to the respective regions 621 and 622 of the first determination result display screen 62. The content representing that the storage apparatus ST as the stop target (the storage 2 in the examples in FIGS. 30 and 31) can be stopped ("Storage 2 can be updated" in FIGS. 30 and 31) is displayed on the region 631. The content representing that a limited operation is specified ("(limited)" in the examples of FIGS. 30 and 31) are also displayed in the region 631. When the administrator designates firmware data to be uploaded and presses the button 632, the management computer 1 starts the process in step S111 in the maintenance operation support process and performs the maintenance operation, that is, update of the firmware of the storage apparatus ST as the stop target.

For instance, at least one limited operation, that is, a list unit 6330 corresponding to each entry of the inhibited migration during stoppage managed in the inhibited migration during stoppage management table 161, is displayed in a list. Each list unit 6330 includes information pertaining to the corresponding inhibited migration during stoppage, for instance, the name of the limited operation ("VM migration" in this embodiment), the name of the VM 71 as the target of the inhibited migration during stoppage, and the name of the virtual server SV as the migration destination of the inhibited migration during stoppage. The second determination result display screen 63 has a paging function of displaying each part of the list units 6330 in the case of including many list units, a function of filtering the list units 6330 and displaying a part thereof, and a function of sorting the list units 6330 and displaying the sorted list units. FIG. 30 shows a first page of the list including the list unit 6330. FIG. 31 shows a second page of the list including the list unit 6330.

The administrator refers to the region 631 to thereby know that the storage apparatus ST as the stop target can be stopped and the limited operation is specified, without taking any measures. The administrator can confirm the content of the limited operation, which is the inhibited migration during stoppage, by referring to the list unit 6330 of each inhibited migration during stoppage in the region 633. In the examples in FIGS. 30 and 31, the administrator can know that the VM migration moving the VMa, VMb, and VMc to the virtual server 2 and the VM migration moving the VMd, VMe and VMf to the virtual server 1 cannot be performed.

Figure 32:
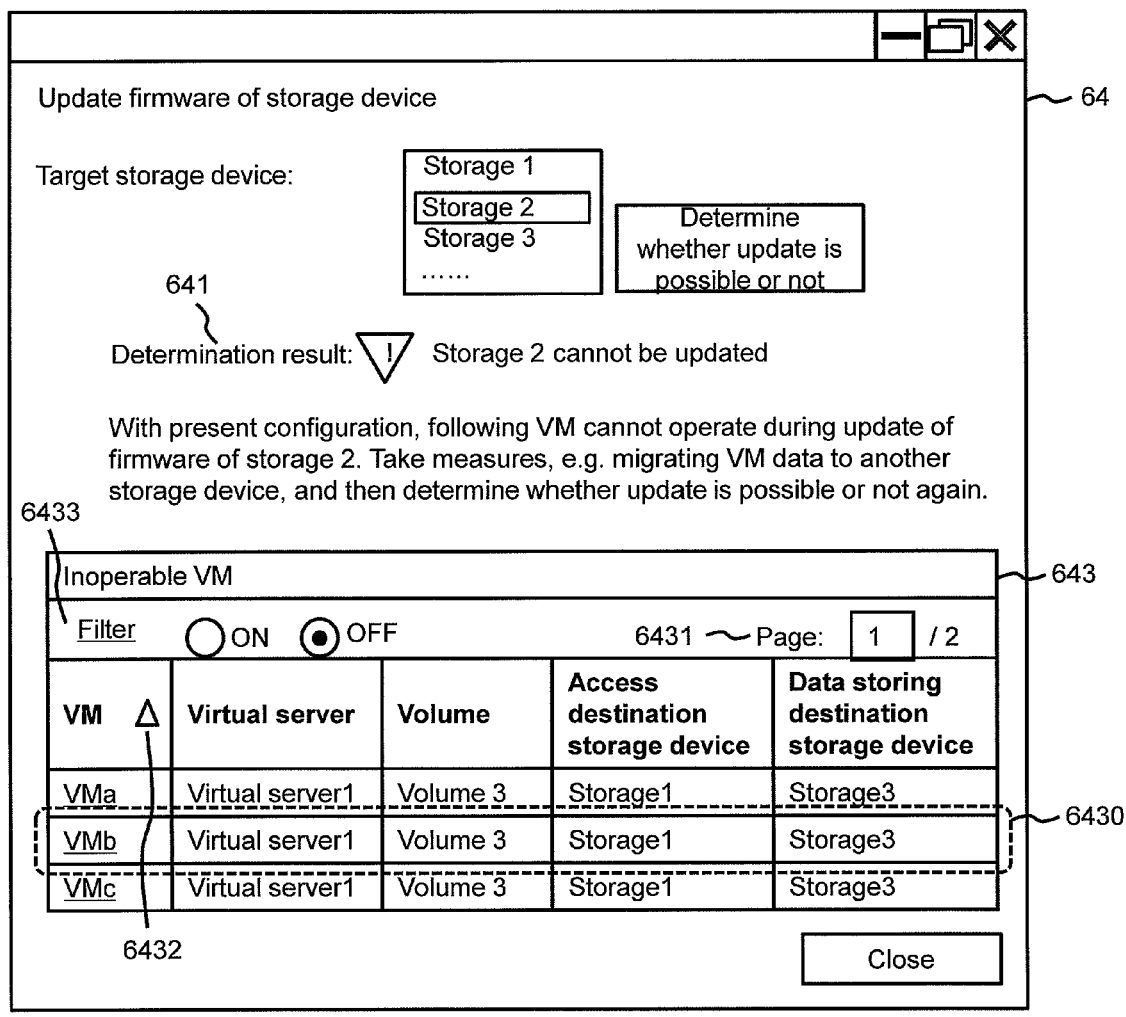
FIG. 32 is a diagram of a configuration of an example of a third determination result display screen according to Embodiment 1.

FIG. 32 is a diagram of a configuration of an example of the third determination result display screen according to Embodiment 1.

The third determination result display screen 64 is a screen for notifying the administrator of determination if the management computer 1 determines that the storage apparatus ST as the stop target cannot be stopped in the maintenance operation support process (step S109 in FIG. 21). The third determination result display screen 64 includes a region 641 for displaying a result of determination of whether stoppage is possible or not, and a region 643 for displaying information pertaining to the VM (hereinafter referred to as an "inoperable VM") 71 that becomes inoperable when the storage apparatus ST as the stop target is stopped. The content representing that the storage apparatus ST as the stop target (storage 2 in the example of FIG. 32) cannot be stopped ("Storage 2 cannot be updated" in the example of FIG. 32) is displayed in the region 641. A warning mark that warns the administrator is also displayed in the region 641.

For instance, at least one list unit 6430 corresponding to the inoperable VM 71 is displayed in a list in the region 643. Each list unit 6430 includes information pertaining to the corresponding inoperable VM 71, for instance, the name of the inoperable VM 71, the name of the virtual server SV on which the inoperable VM 71 is operating, the identifier of the virtual volume 8 used by the inoperable VM 71, the name of the reception storage apparatus ST for the virtual server SV on which the inoperable VM 71 is operating, and the name of the storage apparatus ST storing the VM data 72 of the inoperable VM 71. As with the region 633 in the second determination result display screen 63, the third determination result display screen 64 has a paging function of displaying each part of the list units 6430 in the case of including many list units, a function of filtering the list units 6430 and displaying a part thereof, and a function of sorting the list units 6430 and displaying the sorted list units.

The administrator can know that the storage apparatus ST as the stop target cannot be stopped if measures are not taken, by referring to the region 641. The administrator can know that the VM data access path (i.e. active access-inhibited path during stoppage) (hereinafter referred to as a "cause path") that is actually used by the inoperable VM 71, that is, the VM data access path which is the cause of incapability of stopping the storage apparatus ST as the stop target, by referring to the list unit 6430 of each inoperable VM 71 in the region 643. The administrator can consider measures required to stop the storage apparatus ST as the stop target, by confirming the cause path. For instance, the administrator can consider measures, such as migrating of the VM data 72 to another storage apparatus ST. The list unit 6430 may include data identifying an operation that the inoperable VM 71 is performing, for instance, an operational service. This allows the administrator to know which operation becomes inoperable, in addition to the name of the inoperable VM 71.

Embodiment 2

Next, Embodiment 2 will be described. The management computer 1 according to Embodiment 2 derives a plan of measures (hereinafter referred to as a "measures plan") pertaining to change in configuration of the computer system that is for allowing stoppage of the storage apparatus ST as the stop target if it is determined that the storage apparatus ST as the stop target cannot be stopped in the maintenance operation support process of the Embodiment 1, and notifies the administrator of the plan. The change in configuration of the computer system is, for instance, change in configuration of the storage apparatus ST and change in configuration of the virtual server SV. When the administrator issues an instruction of executing the measures plan, the management computer 1 executes measures according to the measures plan. This can eliminate efforts of the administrator for considering measures by himself/herself.

Measures for allowing stoppage of the storage apparatus ST as the stop target, that is, measures pertaining to change in configuration of the computer system that causes an active access-inhibited path during stoppage (cause path) not to exist include, for instance: (1) first measures for changing the storage apparatus ST as the storing destination of the VM data 72 of the inoperable VM 71; (2) second measures for allowing a new VM data access path to be used instead of the cause path; (3) third measures for performing the VM migration to change the configuration of the VM data access path; and (4) fourth measures that do not use the storage apparatus ST as the stop target.

The second measures, for instance, can identify a new VM data access path (second access path) by the management computer 1 determining whether the new VM data access path replacing the cause path can be configured or not on the basis of coupling information between the virtual server SV and the storage apparatus ST (second storage information) and coupling information between the storage apparatuses ST. For instance, in the configuration in FIG. 1, when the VMd is operating on the virtual server 1, the VM data access path 52 is an active access-inhibited path during stoppage. In this case, the management computer 1 can know that an access path directly accessing from the virtual server 1 to the storage 3 storing the VM data 72 of the VMd without intervention of the storages 1 and 2 can be configured, by referring to the coupling information between the virtual server SV and the storage apparatus ST and the coupling information between the storage apparatuses ST. This access path is not an access-inhibited path during stoppage. Accordingly, the management computer 1 can identify measures for configuring to use the access path directly accessing from the virtual server 1 to the storage 3 instead of the VM data access path 52. Different access paths may be configured for the respective VMs 71. For instance, when the VMa and VMd are operating on the virtual server 1, the virtual server 1 may use the VM data access path 51 for accessing the VM data 72 of the VMa, and use the access path directly accessing from the virtual server 1 to the storage 3 for accessing the VM data 72 of the VMd.

The first measures will hereinafter be described more specifically. More specifically, the measures move data of the entire virtual volume (hereinafter referred to as a "measures-necessitated volume") 8 storing the VM data 72 of the inoperable VM 71 to one storage apparatus (the storage apparatus ST that is other than the storage apparatus ST as the stop target, and hereinafter referred to as a "common direct access apparatus") ST that all of one or more virtual servers SV using the measures-necessitated volume 8 can directly access without intervention of another storage apparatus ST, that is, collects data of the entire measures-necessitated volume into the common direct access apparatus ST.

The configuration of the computer system according to Embodiment 2 is substantially identical to the configuration of the computer system described in Embodiment 1 except for the configuration of the management computer 1. The configuration of the management computer 1 according to Embodiment 2 will hereinafter be described.

Figure 33:
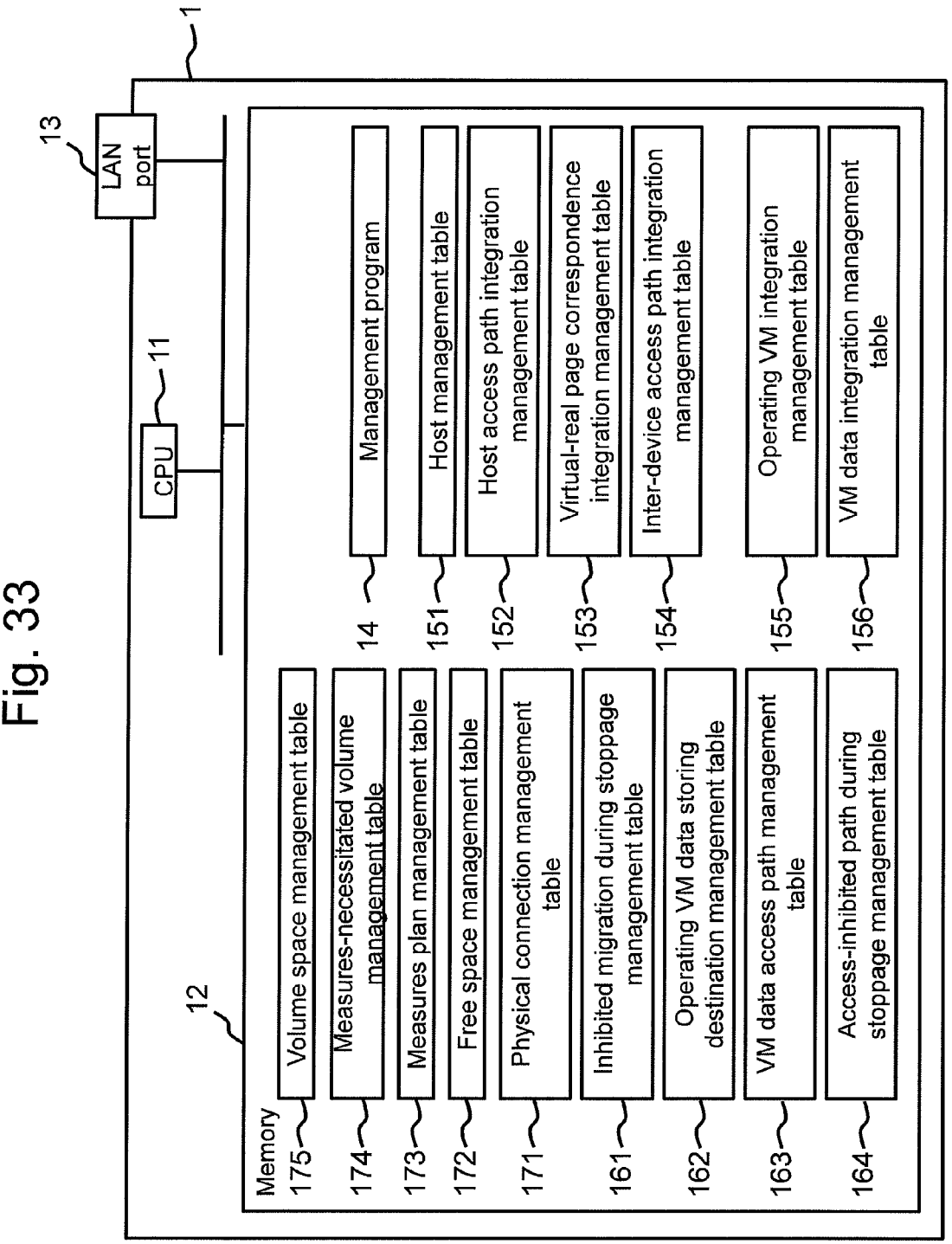
FIG. 33 is a diagram of a configuration of an example of a management computer according to Embodiment 2.

FIG. 33 is a diagram of a configuration of an example of the management computer according to Embodiment 2.

The configuration of the management computer 1 according to Embodiment 2 is substantially identical to the configuration of the management computer 1 according to Embodiment 1 in FIG. 10 except a part thereof. The identical signs are assigned to respective configurational elements identical to those in FIG. 10. The description thereof is omitted.

The memory 12 further stores a physical coupling management table 171, an free space management table 172, a measures plan management table 173, a measures-necessitated volume management table 174, and a volume space management table 175. The physical coupling management table 171 is second storage information indicating at least one storage apparatus ST (second storage) that the virtual server SV can access without intervention of another storage apparatus ST. The free space management table 172 is free space information indicating the free space of the storage area of each of at least one second storage. The measures plan management table 173 manages the measures plans. The measures-necessitated volume management table 174 manages the measures-necessitated volume. The volume space management table 175 is occupied space information indicating the current occupied space of the virtual volume 8. The details of the various pieces of information 171 to 174 stored in the memory 12 will be described later.

FIG. 34 is a diagram of a configuration of an example of the physical coupling management table according to Embodiment 2.

The physical coupling management table 171 manages the storage apparatus (i.e., the second storage, hereinafter referred to as a "direct access device") ST that each virtual server SV existing in the computer system can directly access without intervention of another storage apparatus ST. The physical coupling management table 171 includes fields of a host 1711 and a storage 1712. The host 1711 is stored with the name of the virtual server SV. The storage 1712 is stored with the name of the direct access device to the virtual server SV indicated by the host 1711. According to this diagram, it can be understood that each of the storages 1, 2, and 3 is a direct access device to each of the virtual server 1 and the virtual server 2, that is, these servers can directly access each of the storages 1, 2, and 3. Data stored in the physical coupling management table 171 may be collected by the management computer 1 from the virtual servers SV, the storage apparatuses ST, or the network devices (e.g., a switch) comprising the SAN 41, or input by the administrator.

FIG. 35 is a diagram of an example of a configuration of the free space management table according to Embodiment 2.

The free space management table 172 is data for managing the free space of the storage area of the direct access device. The free space management table 172 includes fields of a storage 1721, a current free space 1722 and a measures-taken free space 1723. The storage 1721 is stored with the name of the direct access device. The current free space 1722 is stored with the value representing the free space of the storage area of the direct access device before an after-mentioned measures plan identifying process (see FIG. 42) is performed. The measures-taken free space 1723 is stored with the value representing the free space of the storage area of the direct access device after the measures plan identified by the measures plan identifying process are taken. For instance, it can be understood, from the first entry from the top in this diagram, that the free space of the storage 1 is 4 TB (terabyte) before the measures plan identifying process is performed, and 2 TB after the measures are taken. Data stored in the free space management table 172 may be collected by the management computer 1 from each storage apparatus ST, or input by the administrator. Before the measures plan identifying process is performed, the measures-taken free space 1723 is stored with the value identical to that of the current free space 1722.

FIG. 36 is a diagram of a configuration of an example of the measures plan management table according to Embodiment 2.

The measures plan management table 173 is data for managing the measures plan identified by the management computer 1. The measures plan management table 173 includes fields of a virtual volume ID 1731 and a movement destination storage 1732. The virtual volume ID 1731 is stored with the identifier of the measures-necessitated volume 8. The movement destination storage 1732 is stored with the name of the storage apparatus ST as the moving destination of the data of the entire measures-necessitated volume. It can be understood that, from this diagram, that the management computer 1 identifies the measures plan moving the data of the entire measures-necessitated volume of "Volume 3" to the storage 1.

FIG. 37 is a diagram of a configuration of an example of the measures-necessitated volume management table according to Embodiment 2.

The measures-necessitated volume management table 174 is data for managing the measures-necessitated volume. The measures-necessitated volume management table 174 includes a field of the virtual volume ID 1741. The virtual volume ID 1741 is stored with the identifier of the measures-necessitated volume. It can be understood that, from this diagram, that the virtual volume of "Volume 3" is the measures-necessitated volume.

FIG. 38 is a diagram of a configuration of an example of the volume space management table according to Embodiment 2.

The volume space management table 175 is data for managing the entire space and the occupied space of each of at least one virtual volume 8 existing in the computer system. The volume space management table 175 includes fields of a virtual volume ID 1751, a space 1752 and an occupied space 1753. The virtual volume ID 1751 is stored with the identifier of the virtual volume 8. The space 1752 is stored with the value representing the entire space of the virtual volume 8. The occupied space 1753 is stored with the value representing the occupied space of the virtual volume 8. For instance, it can be understood, from the first entry from the top in this diagram, that the entire space of the virtual volume of "Volume 2" is 1 TB and the occupied space is 200 GB (gigabyte).

Next, an operation of the management computer 1 according to Embodiment 2 will be described.

Figure 39:
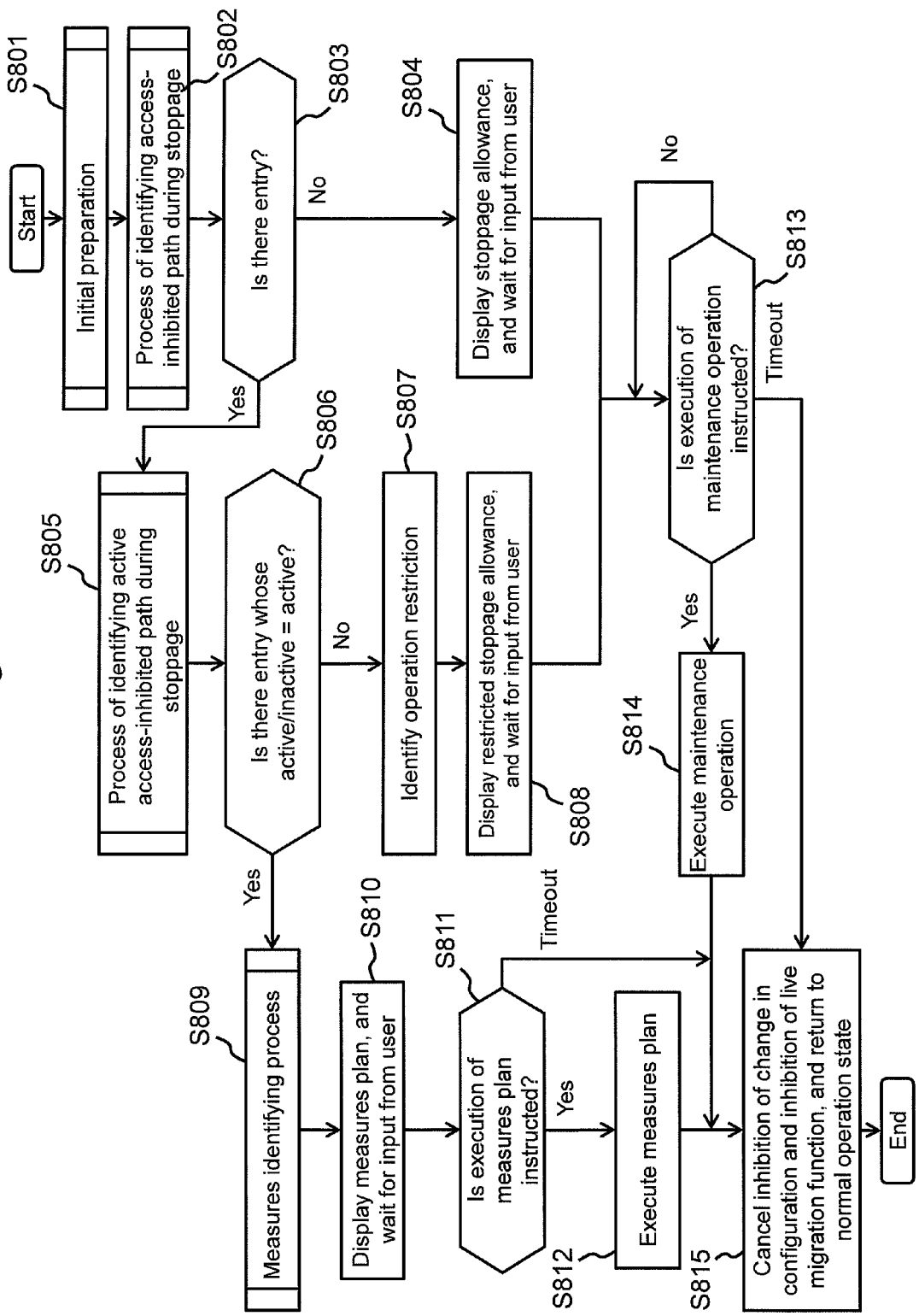
FIG. 39 is a flowchart of a maintenance operation support process according to Embodiment 2.

FIG. 39 is a flowchart of the maintenance operation support process according to Embodiment 2.

The maintenance operation support process according to Embodiment 2 is substantially identical to the maintenance operation support process according to Embodiment 1 in FIG. 21 except a part thereof. The processes in steps S801 to S808 in FIG. 39 are equivalent to those in respective steps S101 to S108 in FIG. 21. The processes in steps S813 to S815 in FIG. 39 are equivalent to those in respective steps S110 to S112 in FIG. 21. In step S801, the initial preparation process in FIG. 22 is executed. However, according to this embodiment, in step S203 in FIG. 22, the physical coupling management table 171, the free space management table 172, and the volume space management table 175 are also updated to those in conformity to the configuration of the computer system at the present time. In step S204 in FIG. 22, all entries in the measures plan management table 173 and the measures-necessitated volume management table 174 are deleted.

In step S806, if it is determined that the active access-inhibited path during stoppage exists (step S806: Yes), the management program 14 executes the measures identifying process (step S809). In this measures identifying process, the measures plan is identified.

Subsequently, the management program 14 causes the display computer 10 to display a fourth determination result display screen (see FIG. 43) representing the content of the measures plan identified in step S809 in addition to the fact that the storage apparatus ST as the stop target cannot be stopped, and advances the processing to step S811 (step S810).

In step S811, the management program 14 waits for an input by the administrator onto the fourth determination result display screen displayed in step S810, more specifically, an input of indicating execution of the measures plan. The management program 14 then determines whether the administrator has instructed execution of the measures plan or a prescribed time has elapsed without the instruction of executing the measures plan by the administrator for executing the measures plan.

If the administrator has instructed execution of the measures plan (step S811: Yes), the management program 14 executes measures according to the measures plan (step S811). For instance, the identified measures plan is a measures plan of moving the entire data of the entire measures-necessitated volume of "Volume 3" to the storage 1, the management program 14 moves the entire data of the virtual volume of "Volume 3" to the storage 1. The management program 14 then configures the reception storage apparatus ST of each virtual server SV using the virtual volume of "Volume 3" to the storage 1. This allows the virtual server SV accessing the virtual volume of "Volume 3" to directly access the storage 1 actually storing the data. Furthermore, the storage 1 is not the storage apparatus ST as the stop target. Thus, no active access-inhibited path during stoppage exists. Subsequently, the management program 14 advances the processing to step S815.

In contrast, the prescribed time has elapsed without an instruction by the administrator for executing the measures plan (step S811: timeout), the management program 14 advances the processing to step S815. The management program 14 completes the process in step S815 and then finishes the maintenance operation support process.

Figure 40:
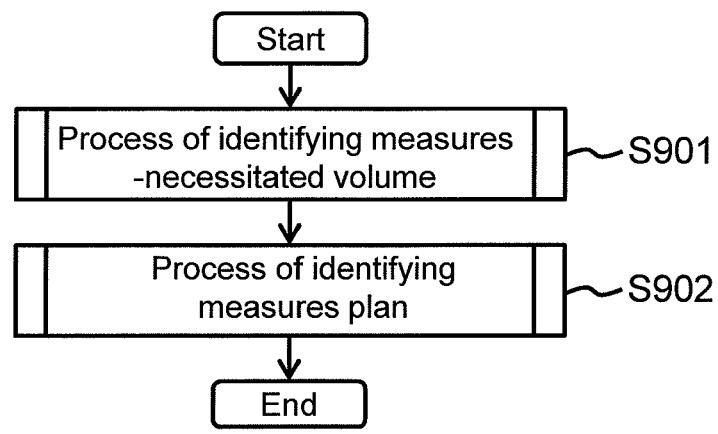
FIG. 40 is a flowchart of measures identifying process according to Embodiment 2.

FIG. 40 is a flowchart of the measures identifying process according to Embodiment 2.

The measures identifying process corresponds to the process in step S809 in FIG. 39.

First, the management program 14 executes the measures-necessitated volume identifying process (see FIG. 41) (step S901). In this measures-necessitated volume identifying process, the measures-necessitated volume is identified.

Next, the management program 14 executes the measures plan identifying process (see FIG. 42) (step S902). In this measures plan identifying process, the measures plan is identified. Subsequently, the management program 14 finishes the measures identifying process.

Figure 41:
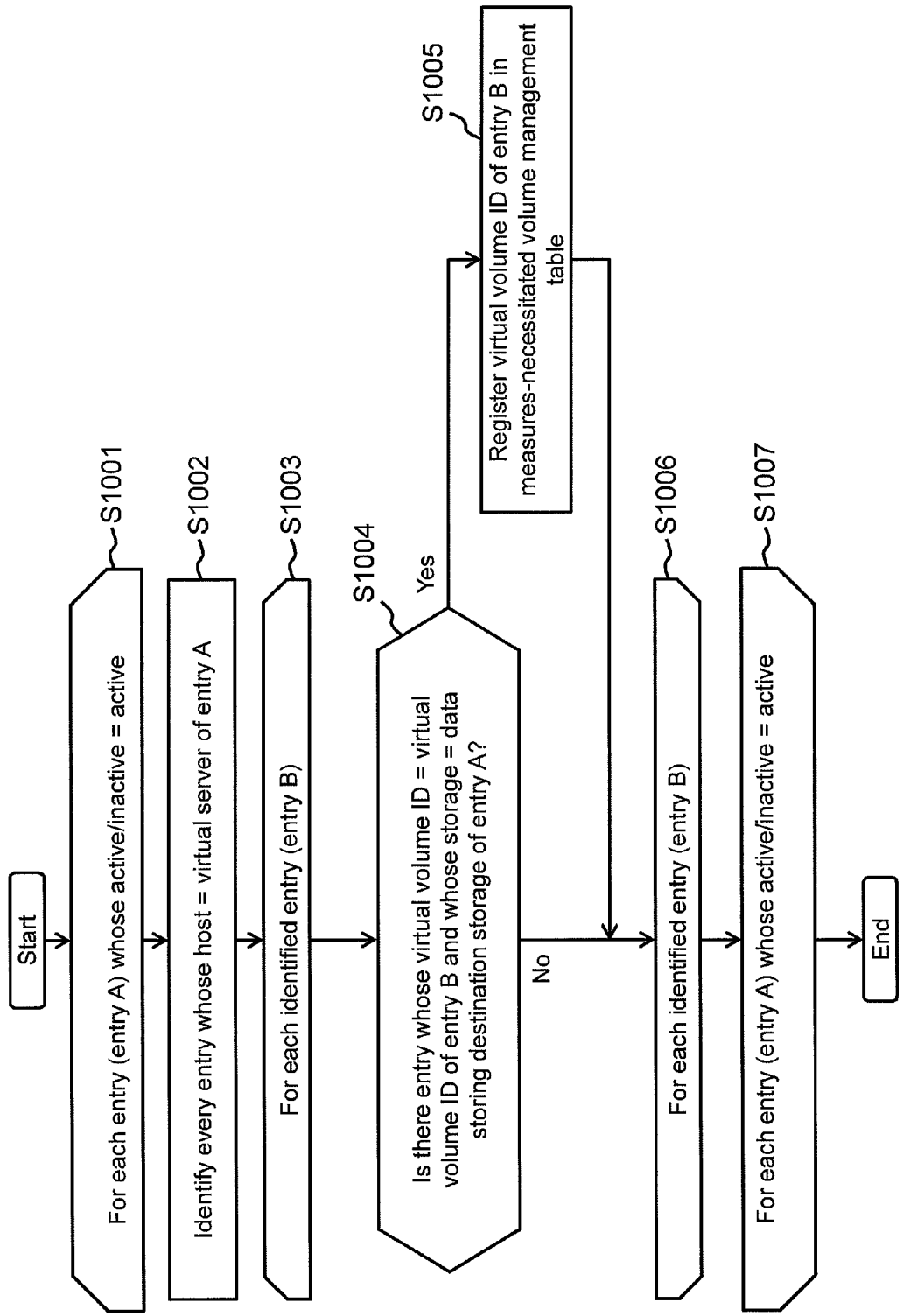
FIG. 41 is a flowchart of a process of identifying a measures-necessitated volume according to Embodiment 2.

FIG. 41 is a flowchart of the measures-necessitated volume identifying process according to Embodiment 2.

The measures-necessitated volume identifying process corresponds to the process in step S901 in FIG. 40.

The management program 14 executes the processes in steps S1001 to S1007 on each entry whose active/inactive 1645 is stored with data indicating activeness among the entries registered in the access-inhibited paths during stoppage management table 164. The management program 14 selects one entry (hereinafter referred to as an "entry A" in the description with reference to FIG. 41) from among the entries whose active/inactive 1645 stored with data indicating activeness among the entries registered in the access-inhibited paths during stoppage management table 164. Hereinafter, in the description with reference to FIG. 41, the active access-inhibited path during stoppage indicated by the entry A, that is, the cause path, is referred to as a "target cause path".

The management program 14 identifies the entry whose host 1521 has a value matching with the value of the virtual server 1641 of the entry A among the entries in the host access path integration management table 152 (step S1002). That is, in step S1002, The management program 14 identifies the entry pertaining to the access originator server SV on the target cause path in the host access path integration management table 152. The management program 14 can know the virtual volume 8 that the access originator server SV on the target cause path accesses, by referring the identified entry.

The management program 14 executes the processing in steps S1003 to S1006 on each entry identified in step S1002. The management program 14 selects one entry (hereinafter referred to as an "entry B" in the description with reference to FIG. 41) from among the entries identified in step S1002. Hereinafter, in the description with reference to FIG. 41, the virtual volume 8 indicated by the virtual volume ID 1522 of the entry B" is referred to as a "target virtual volume".

The management program 14 determines whether or not an entry exists whose virtual volume ID 1531 has a value matching with the value of the virtual volume ID 1522 of the entry B and whose storage 1533 has a value matching with the data storing destination storage 1643 of the entry A in virtual-real page correspondence integration management table 153 (step S1004). That is, in step S1004, The management program 14 determines whether the storage area of the destination storage apparatus ST on the target cause path is assigned to the target virtual volume or not, that is, whether the VM data 72 that the access originator server SV on the target cause path accesses using the target cause path is stored in the target virtual volume or not.

If an entry whose virtual volume ID 1531 has a value matching with the value of the virtual volume ID 1522 of the entry B and whose storage 1533 has a value matching with the value of the data storing destination storage 1643 of the entry A exists in the virtual-real page correspondence integration management table 153, that is, the VM data 72 that the access originator server SV on the target cause path accesses using the target cause path is stored in the target virtual volume (step 1004: Yes), the management program 14 creates an entry indicating the target virtual volume, and registers the created entry in the measures-necessitated volume management table 174. That is, in this case, the target virtual volume is identified as the measures-necessitated volume.

In contrast, if an entry whose virtual volume ID 1531 has a value matching with the virtual volume ID 1522 of the entry B and whose storage 1533 has a value matching with the value of the data storing destination storage 1643 of the entry A does not exist in the virtual-real page correspondence integration management table 153, that is, the VM data 72 that the access originator server SV on the target cause path accesses using the target cause path is not stored in the target virtual volume (step 1004: No), the management program 14 determines that the target virtual volume 8 is not the measures-necessitated volume.

The management program 14 completes the processes in steps S1003 to S1006 on each entry identified in step S1002, and completes the processes in steps S1001 to 1007 on each entry whose active/inactive 1645 is stored with data indicating activeness among the entries registered in the access-inhibited paths during stoppage management table 164, and subsequently finishes the measures-necessitated volume identifying process.

Thus, the management computer 1 identifies the virtual volume 8 storing the VM data 72 that the virtual server SV accesses using the cause path among at least one virtual volume 8 used by the virtual server SV having the cause path, and identifies the identified virtual volume 8 as the measures-necessitated volume.

Figure 42:
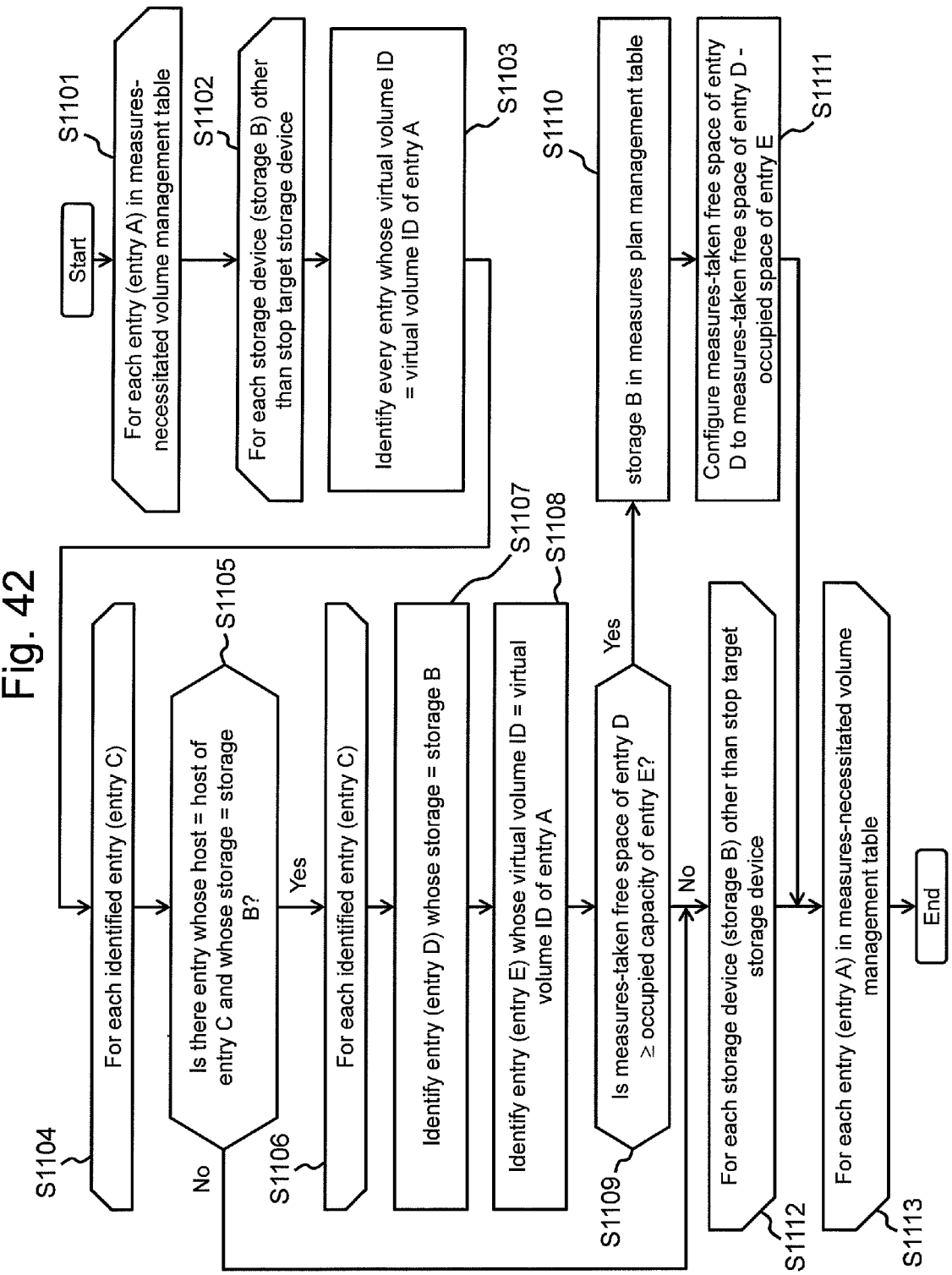
FIG. 42 is a flowchart of a process of identifying a measures plan according to Embodiment 2.

FIG. 42 is a flowchart of the measures plan identifying process according to Embodiment 2.

The measures plan identifying process corresponds to the process in step S902 in FIG. 40.

The management program 14 executes the processes in steps S1101 to S1113 on each entry registered in the measures-necessitated volume management table 174. The management program 14 selects one entry (hereinafter referred to as an "entry A" in the description with reference to FIG. 42) from among the entries registered in the measures-necessitated volume management table 174. Hereinafter, in the description with reference to FIG. 42, the measures-necessitated volume indicated by the entry A is referred to as a "target measures-necessitated volume".

The management program 14 executes the processes in steps S1102 to S1112 on each of storage apparatuses ST that share the target measures-necessitated volume and are other than the storage apparatus ST as the stop target. The management program 14 selects one entry (hereinafter referred to as the "storage B" in the description with reference to FIG. 42) from among the storage apparatuses ST that share the target measures-necessitated volume and are other than the storage apparatus ST as the stop target.

The management program 14 identifies the entry whose virtual volume ID 1522 has a value matching with the value of the virtual volume ID 1741 of the entry A among the entries in the host access path integration management table 152 (step S1103). That is, in step S1103, The management program 14 identifies the entry in the host access path integration management table 152 that pertains to the target measures-necessitated volume. The management program 14 can know the virtual server SV accessing the target measures-necessitated volume, by referring to the identified entry.

The management program 14 executes the processes in steps S1104 to S1106 on each entry identified in step S1103. The management program 14 selects one entry (hereinafter referred to as an "entry C" in the description with reference to FIG. 42) from among the entries identified in step S1103. Hereinafter, in the description with reference to FIG. 42, the virtual server SV indicated by the host 1521 of the entry C is referred to as a "target virtual server".

The management program 14 determines whether an entry exists whose host 1711 has a value matching with the host 1521 of the entry C and whose storage 1712 indicates the storage apparatus ST of the storage B in the physical coupling management table 171 or not (step S1105). That is, in step S1105, this program determines whether the storage B is the direct access device for the target virtual server SV or not.

If an entry whose host 1711 has a value matching with the value of the host 1521 of the entry C and whose storage 1712 indicates the storage apparatus ST of the storage B does not exist in the physical coupling management table 171, that is, the storage B is not the direct access device for the target virtual server SV (step S1105: No), the management program 14 advances the processing to step S1112. If the storage apparatus ST that shares the target measures-necessitated volume and is other than the storage apparatus ST as the stop target exists, the management program 14 selects the storage apparatus ST and performs the processes in steps S1102 to S1112 again.

On all the entries identified in step S1103, if the management program 14 determines that an entry whose host 1711 has a value matching with the value of the host 1521 of the entry C and whose storage 1712 indicates the storage apparatus ST of the storage B exists in the physical coupling management table 171, that is, the storage B is the direct access device for the target virtual server SV, the management program 14 advances the processing to the step S1107. That is, in this case, the storage B is the common direct access apparatus for at least one virtual server SV that accesses the target measures-necessitated volume.

In step S1107, the management program 14 identifies the entry (hereinafter referred to as an "entry D" in the description with reference to FIG. 42) whose storage 1721 indicates the storage apparatus ST of the storage B among the entries in the free space management table 172. The management program 14 can know the free space of the storage area of the storage B of the common direct access apparatus, by referring to the identified entry.

Next, the management program 14 identifies the entry (hereinafter referred to as an "entry E" in the description with reference to FIG. 42) whose virtual volume ID 1751 has a value matching with the value of the virtual volume ID 1741 of the entry A among the entries of the volume space management table 175 (step S1108). The management program 14 can know the occupied space of the target measures-necessitated volume, by referring to the identified entry.

Subsequently, the management program 14 determines whether the value of the measures-taken free space 1723 of the entry D is equal to or larger than the value of the occupied space 1753 of the entry E or not (step S1109). That is, the management program 14 determines whether the entire data of the target measures-necessitated volume can be moved to the storage B as the common direct access apparatus or not.

If the value of the measures-taken free space 1723 of the entry D is not equal to or larger than the value of the occupied space 1753 of the entry E (step S1109: No), the management program 14 advances the processing to step S1112. If the storage apparatus ST that shares the target measures-necessitated volume and is other than the storage apparatus ST as the stop target exists, the management program 14 selects this storage apparatus ST and executes the processes in steps S1102 to S1112 again.

In contrast, if the value of the measures-taken free space 1723 of the entry D is equal to or larger than the value of the occupied space 1753 of the entry E (step S1109: Yes), the management program 14 creates an entry whose virtual volume ID 1731 is stored with the value of the virtual volume ID 1741 of the entry A (i.e., the identifier of the target measures-necessitated volume) and whose movement destination storage 1732 is stored with the name of the storage B, for the measures plan management table 173, and registers the created entry in this management table 173 (step S1110). That is, in step S405, the management program 14 identifies the measures plan of moving the entire data of the target measures-necessitated volume to the storage B (third storage), and registers the entry indicating the measures plan in the measures plan management table 173.

Subsequently, the management program 14 stores the value of the measures-taken free space 1723 of the entry D subtracted by the value of the occupied space 1753 of the entry E, in the measures-taken free space 1723 in the entry D (step S1111). That is, in step S1111, the value of the measures-taken free space 1723 of the free space management table 172 is updated to have a value after measures according to the measures plan identified in step S1110 are taken. Every time when the measures plan is identified, the value of the measures-taken free space 1723 is updated, which can prevent the management computer 1 from deriving an inoperable measures plan.

The management program 14 completes the processes in steps S1101 to S1113 on each entry registered in the measures-necessitated volume management table 174, and subsequently finishes the measures plan identifying process.

Thus, the management computer 1 identifies at least one common direct access apparatus of the virtual server SV that accesses the measures-necessitated volume, and determines whether the entire data of the measures-necessitated volume can be moved to the common direct access apparatus or not on the basis of the occupied space of the measures-necessitated volume and the free space of the storage area of the common direct access device. If the management computer 1 determines that the data can be moved, the management computer 1 identifies a measures plan of migrating the entire data of the target measures-necessitated volume to the common direct access apparatus.

Figure 43:
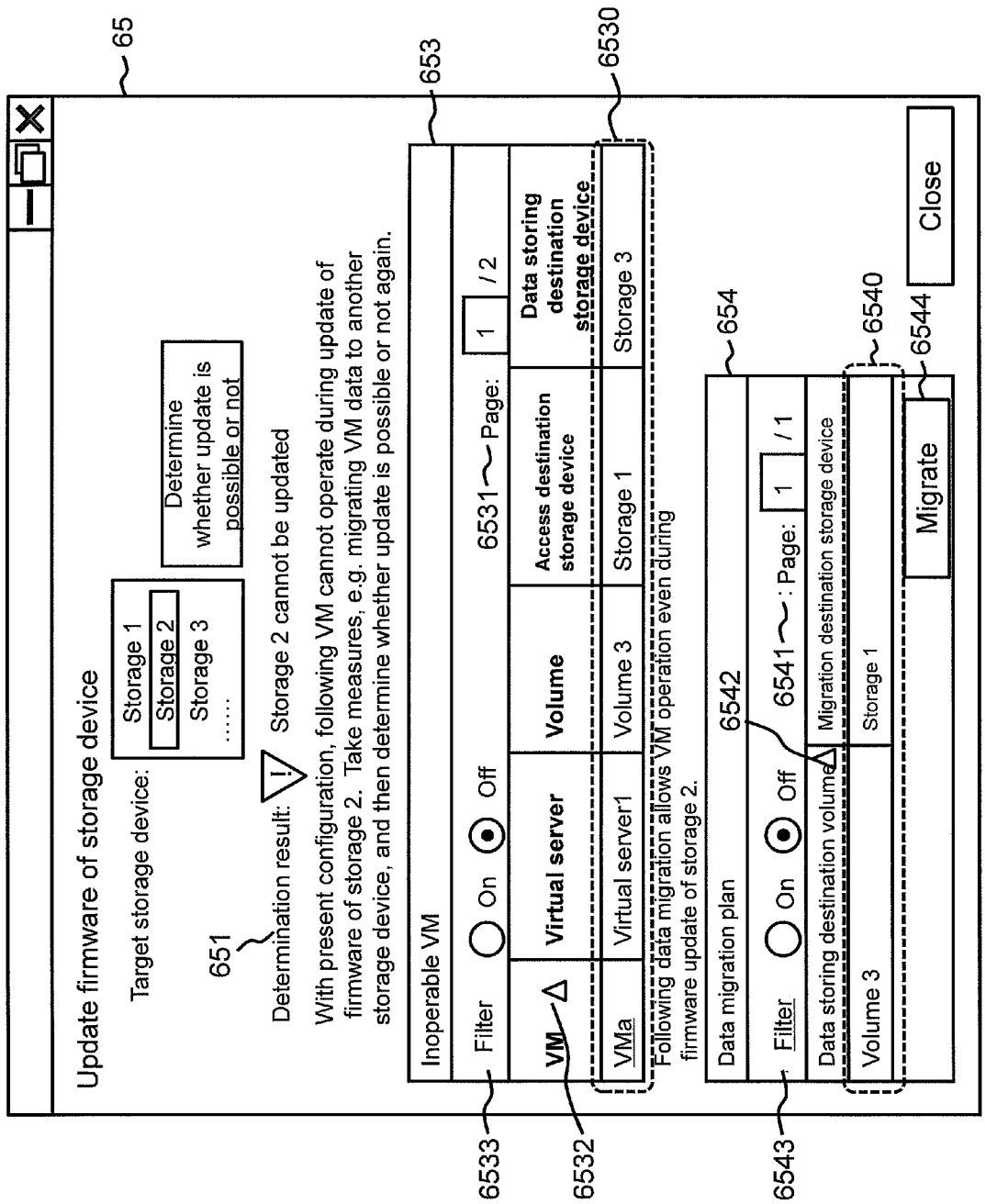
FIG. 43 is a diagram of a configuration of an example of a fourth determination result display screen according to Embodiment 2.

FIG. 43 is a diagram of a configuration of an example of the fourth determination result display screen according to Embodiment 2.

The fourth determination result display screen 65 is a screen for notifying the administrator of determination and the content of the measures plan identified by the management computer 1 if the management computer 1 determines that the storage apparatus ST as the stop target cannot be stopped in the maintenance operation support process (step S810 in FIG. 39). The fourth determination result display screen 65 includes a region 651 for displaying a result of determination of whether stoppage is possible or not, a region 653 for displaying information pertaining to the inoperable VM 71, and region 654 for displaying the content of the measures plan identified by the management computer 1. The regions 651 and 653 are substantially identical to the regions 641 and 643, respectively, on the third determination result display screen 64 according to Embodiment 1.

For instance, the list unit 6540 corresponding to at least one measures plan is displayed in a list on the region 654. Each list unit 6540 includes information pertaining to the corresponding measures plan, for instance, the identifier of the measures-necessitated volume and the name of the storage apparatus ST as the migration destination of the entire data of the measures-necessitated volume. As with the region 653, the fourth determination result display screen 65 has a paging function of displaying each part of the list unit 6540 in the case of including many list units, a function of filtering the list units 6540 and displaying a part thereof, and a function of sorting the list units 6540 and displaying the sorted list units. The region 654 includes a button 6544 for instructing the management computer 1 to execute measures according to the measures plan. When the administrator designates the measures plan to be executed by the management computer 1 and presses the button 6544, the management computer 1 starts the process in step S812 in the maintenance operation support process and executes the measures according to the measures plan designated by the administrator. The management computer 1 allows the administrator to designate the measures plan to be executed. Accordingly, when a plurality of measures plans are identified, the administrator can cause the computer to execute the designated measures plan among the measures plans.

The administrator can know that the storage apparatus ST as the stop target cannot be stopped without any measures, by referring to the region 651. The administrator can also know the cause path by referring to the list unit 6530 of each inoperable VM 71 in the region 653. The administrator can further know which measures are available to stop the storage apparatus ST as the stop target, by referring to the list unit 6540 of each measures plan in the region 654. This can eliminate efforts of the administrator considering measures by himself/herself.

The present invention is not limited to the above-described embodiments. It is the matter of course that the present invention can be variously modified within the scope without departing from the gist thereof.

REFERENCE SIGNS LIST

1 . . . management computer, ST . . . storage apparatus, SV . . . virtual server, 41 . . . SAN, 42 . . . management LAN

The invention claimed is:
1. A management system managing a computer system including a plurality of storage apparatuses, and a server using a virtual volume that is a virtual logical volume shared by the plurality of storage apparatuses, comprising:
a storage device; and
a control device coupled to the storage device,
wherein the storage device is configured to
stores access path information indicating at least one storage apparatus existing on each access path that is a path from the server to one of the storage apparatuses and used by the server for accessing an storage area of the storage apparatuses, and the control device is configured to:

accept a selection of a first storage apparatus to be a determination target from among the plurality of storage apparatuses;

perform a first determination of whether a first access path including the first storage apparatus exists or not on the basis of the access path information;

if the first access path exists, perform a second determination of whether the first access path is an active access path used by the server for accessing the storage area assigned to a part of the virtual volume used by the server, and determine whether the first storage apparatus can be stopped or not on the basis of a result of the first determination or a result of the second determination;

wherein the storage device is configured to store assignment information indicating to which parts of the virtual volume the respective storage areas of the plurality of storage apparatuses are assigned, and usage information that indicates which part of the virtual volume the server uses, and the control device is configured to perform the second determination on the basis of the assignment information and the usage information.

2. A management system according to claim 1, wherein the control device is configured, if at least one first access path exists and any of the first access path is an active access path, to determine that the first storage apparatus cannot be stopped, and to display information representing that the first storage apparatus cannot be stopped and information pertaining to the active first access path.

3. A management system according to claim 2, wherein the storage device is configured to further stores second storage apparatus information indicating at least one second storage apparatus that the server is capable of directly accessing without passing through another storage apparatus, free space information indicating an free space of a storage area of each of the at least one second storage apparatus, and occupied space information indicating a current occupied space of the virtual volume, and the control device is configured, if the at least one first access path exists and any of the first access path is an active access path, to identify a third storage apparatus that is a storage apparatus other than the first storage apparatus and has an free space of a storage area equal to or larger than the current occupied space of the virtual volume, among the at least one second storage apparatus, on the basis of the second storage apparatus information, the free space information, and the occupied space information, and identifies migration of data of the entire virtual volume to the third storage apparatus as a measure.

4. A management system according to claim 3, wherein the storage device is configured to further store coupling information representing relationship of coupling between the storage apparatuses, and the control device is configured, if the at least one first access path exists and any of the first access path is an active access path, to determine whether a second access path that can replace the active first access path and does not include the first storage apparatus can be configured or not on the basis of the second storage apparatus information and the coupling information, and, if determine that the second access path can be configured, to identify configuring of the second access path instead of the active first access path as the measure.

5. A management system according to claim 1, wherein the control device is configured, if the first access path does not exist, or the at least one first access path exists and all the first access path are not an active access path, to determine that the first storage apparatus can be stopped and to display information indicating that the first storage apparatus can be stopped.

6. A management system according to claim 1, wherein the control device is configured, if the at least one first access path exists and any of the first access path is an active access path, to identify a measure that is for eliminating an active first access path and pertains to change in configuration of the computer system, and to display information which indicates that the first storage apparatus cannot be stopped and which pertains to the active first access path, and content of the measure.

7. A management system according to claim 1, wherein the control device is configured, if the at least one first access path exists and any of the first access path is not an active access path, to determine whether an operation that can change any of the first access path into an active access path and that pertains to change in configuration of the computer system is exist or not, and, if the operation exists, to display information which indicates the first storage apparatus can be stopped, and content of the operation.

8. A management system according to claim 1, wherein the computer system comprises a plurality of the servers, at least one virtual machine using the virtual volume is operating on each server, the storage device is configured to store virtual machine usage information indicating which part of the virtual volume each of the at least one virtual machine operating on each of the servers uses, and the control device is configured, in the second determination, if the first access path is an access path that the server uses for accessing the storage area assigned to a part of the virtual volume used by the virtual machine operating on any of the servers, to determine the first access path as an active access path, on the basis of the assignment information and the virtual machine usage information, and, if the at least one first access path exists and all the first access path are not an active access path, to determine for each server using the first access path whether an operation that migrates the virtual machine operating on another server to the server and that changes the first access path used by the server into an active path exists or not on the basis of the assignment information, the virtual machine usage information, and the access path information.

9. A management system according to claim 1, wherein the control device is configured after accepting a selection of the first storage apparatus, to acquire individual assignment information indicating to which part of the virtual volume the storage area of the storage apparatus is assigned and inter-storage apparatus information indicating the at least one storage apparatus existing on a path from the storage apparatus to another storage apparatus, from each of the storage apparatuses, after accepting the selection of the first storage apparatus, to acquire inter-server-storage apparatus information indicating that the storage apparatus is an issuance destination of an access request by the server to the virtual volume, from the at least one storage apparatus, after accepting the selection of the first storage apparatus, to acquire the usage information, from the server, and to generate the assignment information on the basis of the individual assignment information, and generate the access path information on the basis of the assignment information; the inter-storage apparatus information, and the inter-server-storage apparatus information.

10. A management method for a management system managing a computer system including a plurality of storage apparatuses, and a server using a virtual volume that is a virtual logical volume shared by the storage apparatuses, comprising:

accepting a selection of a first storage apparatus to be a determination target from among the plurality of storage apparatuses;

performing a first determination of whether a first access path including the first storage apparatus exists or not on the basis of access path information indicating at least one storage apparatus existing on an access path that is a path from the server to one of the storage apparatuses;

if the first access path exists, performing a second determination of whether the first access path is an active access path used by the server for accessing the storage area assigned to a part of the virtual volume used by the server, and determining whether the first storage apparatus can be stopped or not on the basis of a result of the first determination or a result of the second determination, wherein a control device identifies a measure that is for eliminating an active first access path and pertains to change in configuration of the computer system if the at least one first access path exists and any of the first access path is an active access path, and displays information which indicates that the first storage apparatus cannot be stopped and which pertains to the active first access path, and content of the measure.

11. A management method according to claim 10, wherein the control device determines that the first storage apparatus cannot be stopped if at least one first access path exists and any of the first access path is an active access path, and displays information representing that the first storage apparatus cannot be stopped and information pertaining to the active first access path.

12. A management method according to claim 10, wherein the control device determines that the first storage apparatus can be stopped and to display information indicating that the first storage apparatus can be stopped, if the first access path does not exist, or the at least one first access path exists and all the first access path are not an active access path.

13. A management method according to claim 10, wherein the control device is configured, if at least one first access path exists and any of the first access path is an active access path, to determine that the first storage apparatus cannot be stopped, and to display information representing that the first storage apparatus cannot be stopped and information pertaining to the active first access path.

14. A management method according to claim 10, wherein the computer system comprises a plurality of the servers, at least one virtual machine using the virtual volume is operating on each server.

15. A non-transitory computer-readable medium storing a set of instructions for execution by a general purpose computer, which will cause the general purpose computer to perform a method for a management system managing a computer system including a plurality of storage apparatuses, and a server using a virtual volume that is a virtual logical volume shared by the storage apparatuses, the method comprising:

accepting a selection of a first storage apparatus to be a determination target from among the plurality of storage apparatuses;

performing a first determination of whether a first access path including the first storage apparatus exists or not on the basis of access path information indicating at least one storage apparatus existing on an access path that is a path from the server to one of the storage apparatuses;

if the first access path exists, performing a second determination of whether the first access path is an active access path used by the server for accessing the storage area assigned to a part of the virtual volume used by the server, and determining whether the first storage apparatus can be stopped or not on the basis of a result of the first determination or a result of the second determination, wherein the first storage device is configured to store assignment information indicating to which parts of the virtual volume the respective storage areas of the plurality of storage apparatuses are assigned, and usage information that indicates which part of the virtual volume the server uses, and a control device is configured to perform the second determination on the basis of the assignment information and the usage information.

16. A non-transitory computer readable medium according to claim 15, wherein the control device determines that the first storage apparatus cannot be stopped if at least one first access path exists and any of the first access path is an active access path, and displays information representing that the first storage apparatus cannot be stopped and information pertaining to the active first access path.

17. A non-transitory computer readable medium according to claim 15, wherein the control device determines that the first storage apparatus can be stopped and to display information indicating that the first storage apparatus can be stopped, if the first access path does not exist, or the at least one first access path exists and all of the first access path is not an active access path.

* * * * *